United States Patent [19]

Weiman et al.

[11] Patent Number: 4,979,136

[45] Date of Patent: Dec. 18, 1990

[54] PROCESSING SYSTEM AND METHOD FOR ENHANCING IMAGE DATA

[75] Inventors: Carl F. R. Weiman, Westport; William Pong, Brookfield Center, both of Conn.

[73] Assignee: Transitions Research Corporation, Danbury, Conn.

[21] Appl. No.: 162,752

[22] Filed: Mar. 1, 1988

[51] Int. Cl.$^5$ ............... G06F 15/20; G06F 15/353
[52] U.S. Cl. .................. 364/572; 364/900; 364/574; 364/927.63; 382/51; 382/54; 358/36; 358/167
[58] Field of Search ............ 364/572, 574, 715.01, 364/900, 521; 382/54, 51, 27, 36; 358/36, 167, 43

[56] References Cited

U.S. PATENT DOCUMENTS

| | | | |
|---|---|---|---|
| 4,364,024 | 12/1982 | Paetsch | 364/900 |
| 4,513,440 | 4/1985 | Delman et al. | 364/900 |
| 4,630,106 | 12/1986 | Morimura et al. | 358/43 |
| 4,656,665 | 4/1987 | Pennebaker | 382/51 |
| 4,783,753 | 11/1988 | Crimmins | 364/574 |
| 4,802,108 | 1/1989 | Bagdis et al. | 364/715.01 |

OTHER PUBLICATIONS

Kuang et al.; "A Fast Two-Dimensional Median Filtering Algorithm"; IEE Transactions on Acoustic; vol. 27, 1979.
Gonzales et al.; "Digital Image Processing"; Addison-Wesley; 1987.
Rao et al; "A New Algorithm for Real-Time Median Filtering"; IEE Transactions on Acoustics; vol. 34, Dec. 1986.

Primary Examiner—Felix D. Gruber
Assistant Examiner—Ellis B. Ramirez
Attorney, Agent, or Firm—Darby & Darby

[57] ABSTRACT

A non-linear digital filter system for image data or other signal data suppresses undesirable noise while enhancing significant characteristics of the data. Data elements in a neighborhood (window) defined around and including an input data element are classified into characteristic classes based on their parameter value range. The class with the maximum population is selected as most representative of the neighborhood. A data value associated with that class is chosen as the output of the filter for the input data element around which the neighborhood is defined, to thereby form a plurality filter.

As an alternative, the class holding more than half the data elements in the neighborhood is chosen as most representative, to form a majority filter. In case there is no class containing more than half the elements in a neighborhood, the output of the filter equal the value characteristic of the class in which the input pixel itself falls. In a further heterogeneity filter version, a data element for whose neighborhood there is no majority class is replaced by a "1"; a pixel for whose neighborhood there is a majority class is replaced by a "0". In the case of image data, the "1" value may represent a black intensity or a white intensity, in which case the "0" represents the opposite intensity.

34 Claims, 11 Drawing Sheets

FIG. 3a
Pixel Value
```
A = 0 1 1
B = 0 1 0
C = 0 0 0
D = 1 1 1
E = 1 1 1
F = 1 1 0
G = 0 1 1
H = 0 1 1
I = 0 1 1
J = 0 1 0
K = 1 0 1
L = 1 1 0
        ⎵
       bin
      number
```
FIG. 3b
Number of Pixels Within each Bin
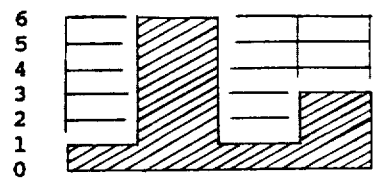
Histogram Bin Number: 00  01  10  11
FIG. 4
Decimal (Binary)
```
7  (111)
6  (110)
5  (101)
4  (100)
3  (011)
2  (010)
1  (001)
0  (000)
```
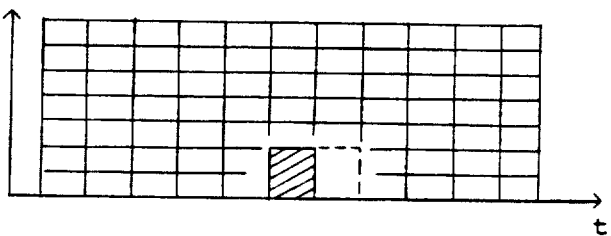
t
Pixel Label: A  B  C  D  E  F  G  H  I  J  K  (L)

|  | MASK | | | Number of msb's selected |
|---|---|---|---|---|
| msb select 22 | 1 | 0 | 0 | 1 |
| x   x   x | 1 | 1 | 0 | 2 |
|  | 1 | 1 | 1 | 3 |

| OUTPUT PIXEL | STAGE → | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
|  | X | A | X | X | X | X | X | X | X | X | X | X |
|  | X | B | A | X | X | X | X | X | X | X | X | X |
|  | X | C | B | A | X | X | X | X | X | X | X | X |
|  | X | D | C | B | A | X | X | X | X | X | X | X |
|  | X | E | D | C | B | A | X | X | X | X | X | X |
|  | A | F | E | D | C | B | A | X | X | X | X | X |
|  | B | G | F | E | D | C | B | A | X | X | X | X |
|  | C | H | G | F | E | D | C | B | A | X | X | X |
|  | D | I | H | G | F | E | D | C | B | A | X | X |
|  | E | J | I | H | G | F | E | D | C | B | A | X |
|  | F | K | J | I | H | G | F | E | D | C | B | A |
|  | G | L | K | J | I | H | G | F | E | D | C | B |
|  | H | M | L | K | J | I | H | G | F | E | D | C |
|  | I | N | M | L | K | J | I | H | G | F | E | D |
|  | J | O | N | M | L | K | J | I | H | G | F | E |

FIG. 12
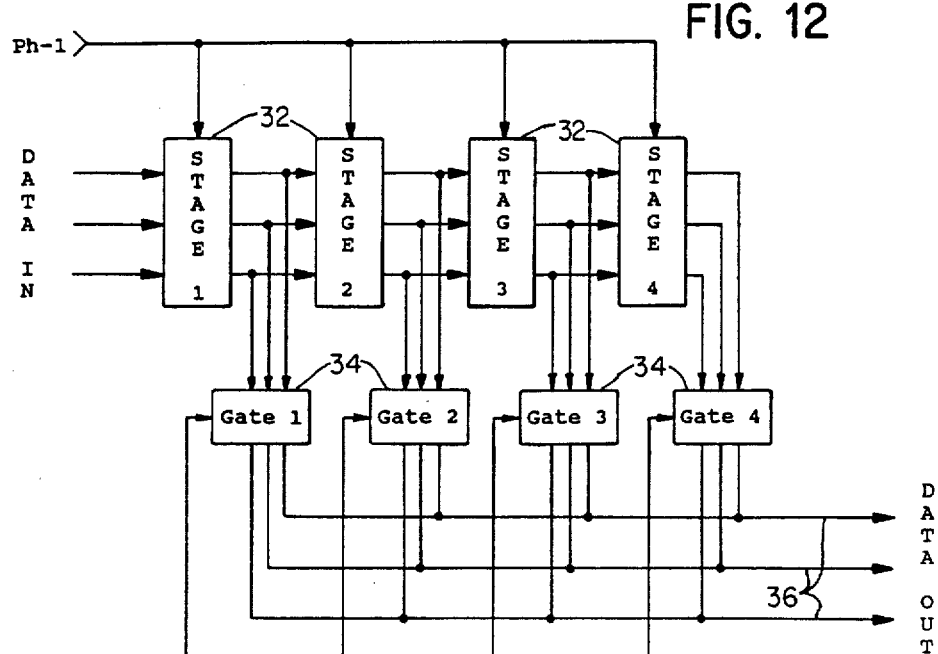
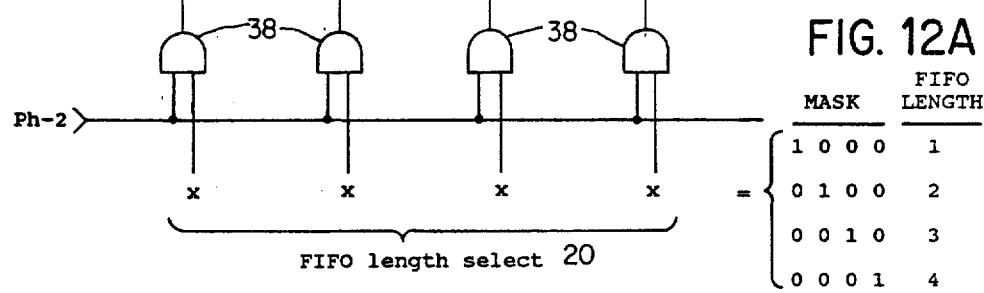
FIG. 12A
| MASK | FIFO LENGTH |
|---|---|
| 1 0 0 0 | 1 |
| 0 1 0 0 | 2 |
| 0 0 1 0 | 3 |
| 0 0 0 1 | 4 |

| Output Pixel | Ph-1 cycle | FIFO CONTENTS (→in . . . . . out→) | | | | | | | | |
|---|---|---|---|---|---|---|---|---|---|---|
|   | 1  | A1 | X  | X  | X  | X  | X  | X  | X  | X  |
|   | 2  | A2 | A1 | X  | X  | X  | X  | X  | X  | X  |
| X | 3  | A3 | A2 | A1 | X  | X  | X  | X  | X  | X  |
|   | 4  | B1 | A3 | A2 | A1 | X  | X  | X  | X  | X  |
|   | 5  | B2 | B1 | A3 | A2 | A1 | X  | X  | X  | X  |
| A2 | 6 | B3 | B2 | B1 | A3 | A2 | A1 | X  | X  | X  |
|   | 7  | C1 | B3 | B2 | B1 | A3 | A2 | A1 | X  | X  |
|   | 8  | C2 | C1 | B3 | B2 | B1 | A3 | A2 | A1 | X  |
| B2 | 9 | C3 | C2 | C1 | B3 | B2 | B1 | A3 | A2 | A1 |
|   | 10 | D1 | C3 | C2 | C1 | B3 | B2 | B1 | A3 | A2 | A1 |
|   | 11 | D2 | D1 | C3 | C2 | C1 | B3 | B2 | B1 | A3 | A2 |
| C2 | 12 | D3 | D2 | D1 | C3 | C2 | C1 | B3 | B2 | B1 | A3 |
|   | 13 | E1 | D3 | D2 | D1 | C3 | C2 | C1 | B3 | B2 | B1 |
|   | 14 | E2 | E1 | D3 | D2 | D1 | C3 | C2 | C1 | B3 | B2 |
| D2 | 15 | E3 | E2 | E1 | D3 | D2 | D1 | C3 | C2 | C1 | B3 |

PROCESSING SYSTEM AND METHOD FOR ENHANCING IMAGE DATA

FIELD OF THE INVENTION

The field of the present invention relates generally to data processing and filter systems for both eliminating noise and enhancing features of data relating to visual images or other data, and more particularly relates to such systems and methods using non-linear digital data processing.

BACKGROUND OF THE INVENTION

In processing data, particularly data relating to visual images for example, many systems include filters for suppressing undesirable noise components of the image data, while enhancing characteristics of the data representing significant features of the image. One example of such filters is a median filter. A median filter enhances trend changes and suppresses small-scale variations in image data. A paper entitled "Fast Computing Median Filters On General-Purpose Image Processing Systems", authored by Urs E. Ruttimann and Richard L. Webber, which appeared in Optical Engineering, (SPIE), Sept., 1986, Volume 25, No. 9, pages 1064 through 1067, and a paper entitled "A Fast Method for Real-Time Median Filtering" by E. Ataman, in the IEEE Transactions on Acoustics, Speech and Signal Processing, Vol. ASSP-28, No. 4, Aug. 1980 at page 415, are believed to summarize state-of-the-art embodiments of median-like filters using general-purpose image processing systems, such as The National Bureau of Standards PIPE system. Such median filters require generally n comparison operations for each n×1 (1-dimensional) window due to the necessity of rank-sorting of the data items. As will be shown below, the present invention requires only two comparisons per window, for one-dimensional processing, no matter what the size of the one-dimensional window. For two-dimensional windows of n×n data items, median filters implemented by rank-sorting require on the order of n-squared operations, in general. In such cases, the present invention provides a filter system also requiring only on the order of n comparison operations.

In Arai, et al. U.S. Pat. No. 4,298,895, noise is eliminated from digitally recorded visual image data by first determining the proportion of picture elements (pixels) in an area surrounding an objective area having a first visual level or component, and then assigning the same visual level or component to the objective area when the proportion is above a predetermined value, thereby providing a majority filter for binary images. More specifically, in this prior system, image levels are binary, and are assigned one bit per pixel. If the binary values of pixels surrounding a pixel being processed are summed together, and exceed a predetermined threshold value, the pixel being processed is assigned a value of 1. Accordingly, this prior system represents a one-bit fixed-neighborhood majority filter for binary images. As a result, the method disclosed is inapplicable for processing gray-scale image data.

Unlike Arai, the present invention involves creating a local histogram, rather than a simple count. Arai uses threshold comparisons for pixel selection, whereas in the present invention selection is based on histogram bin comparison.

In Sternberg U.S. Pat. No. 4,301,443, an image analyzer system is disclosed for analyzing image patterns comprised of a matrix of points each representing a multi-bit digital electrical signal. A chain of identical serial neighborhood transformation stages is included, with each stage including a plurality of input lines for forming an input data bus, with each line carrying a particular digital data bit. Each stage includes an analysis circuit for analyzing the digitized image patterns. A central controller is used to operate selector circuitry for selecting particular bits of data to be analyzed by each stage in processing the image data.

Frankle, et al. U.S. Pat. No. 4,384,336 teaches a system for calculating an approximation of visual properties of objects. The system optimizes imaging data for use in particular display media such as photography, television and printing. Lightness fields are produced from multiple comparisons between information associated with different segmental areas of a given image field. Different groups of the segmental areas are utilized in making the comparisons, wherein the different groupings have at least one spatial parameter different from other of the groupings. The comparisons are made in a predetermined sequence, and employ the results of prior comparisons.

In Delman U.S. Pat. No. 4,513,440, a median filter is disclosed for processing high resolution image data, including gray-scale data. Gray-scale image pixels are rank-sorted in a neighborhood by bit-serial pipeline processing. The hardware median filter disclosed provides output imagery similar to the present invention, but functions differently and uses different hardware than the present invention.

In Lougheed U.S. Pat. No. 4,541,116, an image filter for providing neighborhood image processing is disclosed. The values of neighboring pixels in an image are compared with the value of a given pixel within the group. The comparison results are combined for forming a vector to address a programmable look-up table. A selector is controlled by the output of the look-up table for either maintaining the value of a pixel being processed, or changing the value of the pixel into the value of a neighboring pixel, the latter value having been ranked in a predetermined order by a rank sorter providing comparison of the values of pixels within a given neighborhood. In other words, median filtering is provided via pairwise comparisons of neighboring pixels, which are passed through the look-up table in a sorting operation.

In Fox et al U.S. Pat. No. 4,554,593, an image-processing system is disclosed for reproducing on a bi-level median documents having mixed formats, such as text, half-tone, and continuous tone, via selective thresholding of scan PEL values derived from the characteristics of the image material to be reproduced. The PEL values are selectively applied to one of a plurality of threshold devices for thresholding a predetermined format, including symmetry discrimination in conjunction with an information homogeneity discriminator for eliminating local anomalies.

Higgans U.S. Pat. No. 4,625,330, discloses a system for enhancing analog video pulses. Binary OCR image data is converted to gray-scale data via the video system. The converted data is then scaled to 3-bits to reduce combinatoric searching requirements for determining all likely acceptance or rejection patterns of selected neighbors. Accepted patterns are provided as binary output signals.

In relation to the above-mentioned prior art references, the present invention is a significant improvement in that no rank-sorting of data is required. In general, each prior art patent is based on a particular sorting method requiring serial, bitwise, or pairwise comparators, or table lookup. Such methods require increasing amounts of hardware and lower speeds as the size of the window increases. In contrast, the present invention requires no extra hardware or slowdown for arbitrarily large windows for one-dimensional windows. For two-dimensional windows, the prior art requires extra hardware and processing speed reductions at least proportional to the number of pixels in the window. For the plurality filter embodiment of the present invention, the proportion is the "front porch" on the advancing window, a much smaller number than that of prior art. For a window consisting of k rows by k columns, $n=k^2$ and the front porch consists of $k=\sqrt{n}$ pixels. Similarly, for a window of h rows by k columns, the front porch consists of h pixels. The current window technique in which a reduced precision histogram is applied to a local window in the present invention is unique and more efficient compared to prior art.

SUMMARY OF THE INVENTION

An object of the invention is to provide an improved non-linear digital data (e.g. image) processing filter and method.

Another object of the invention is to provide a plurality filter and method for processing data.

Another object of the invention is to provide a majority filter and method for processing data.

Another object of the invention is to provide an improved majority or heterogeneity filter for processing data.

Another object of the invention is to provide a filter and method including the capability of preselection for either plurality, majority, or heterogeneity filtering of data.

Another object of the invention is to provide an improved non-linear filter and method for image data having window selection capability.

Another object of the invention is to provide a plurality filter algorithm incorporated in a hardware system and a method permitting image data processing at video scan rates.

With these and other objects in mind, the present invention includes means for constructing a histogram of simplified pixel values in a fixed neighborhood of a target pixel, wherein the simplified pixel values have been stripped of a predetermined number of least significant bits, and means for replacing the target pixel (namely, the pixel at the center of the current window) with the address of the most populated histogram bin, shifted a number of bits left equivalent to the number of least significant bits stripped away, for ensuring that the ultimate target pixel data is scaled the same as the original data for the source image.

BRIEF DESCRIPTION OF THE DRAWINGS

FIGS. 3A and 3B show pixel values and a histogram of the image data of FIG. 2;

FIG. 4 shows a graph of the output result from filtering the centermost pixel of the current window having the pixels of FIG. 2 through use of the histogram of FIG. 3, according to one embodiment of the present invention;

FIG. 12 shows a logic diagram for a FIFO shift register length select circuit useful in the present invention;

FIG. 12A shows a mask used with FIG. 12;

DETAILED DESCRIPTION OF THE PREFERRED EMBODIMENTS OF THE INVENTION

As will be shown below, the present method and apparatus for processing image data for a one-dimensional window requires only one main comparison operation per window, no matter what the size of the window. Contrarywise, as previously mentioned, prior median filtering systems require on the order of n such comparison operations for n-1 one-dimensional windows, due to the need for rank-sorting of data. For multi-dimensional cases, such as two-dimensional cases, the present filter invention requires fewer comparison operations than rank-sorting methods, as will be shown.

General System Description

Figure 1:
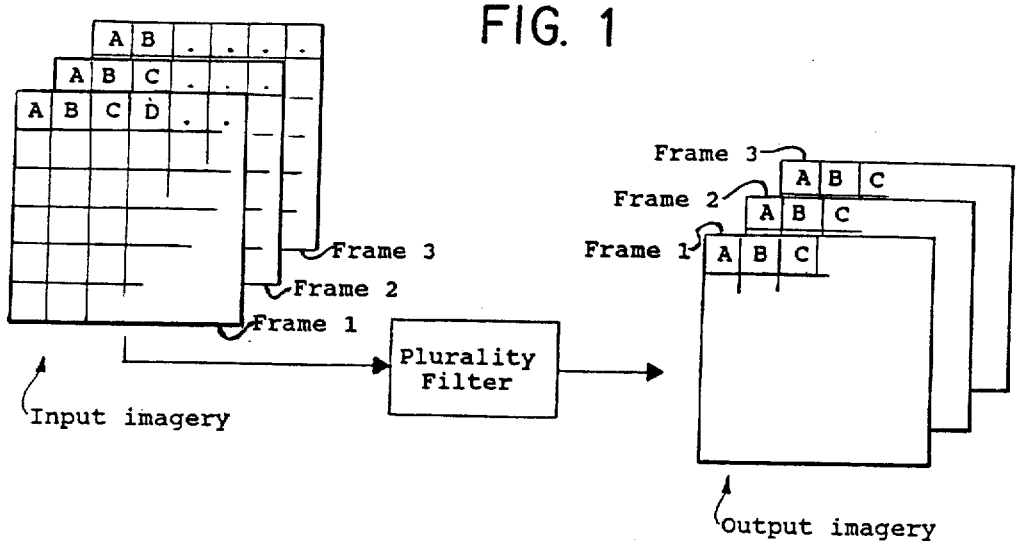
FIG. 1 shows a general simplified diagram of one embodiment of the invention as incorporated in a typical image data system for real-time processing.

FIG. 1 shows schematically the data flow through an image data processor system utilizing the plurality filter of the present invention. In the present system, an image may be scanned line by line, as is conventional, to provide a video signal. Each element area of the image may be deemed a pixel, which can be identified by binary digits representing its intensity or gray-scale value. For processing or utilization, a portion of the image, designated as a "window", may be defined. This may consist of a contiguous set of pixels (or other data elements). A source frame buffer may hold the data for future processing. The original video image data is represented by a sequence of video frames (Frame 1, Frame 2, Frame 3 etc.), each having digitized video data, such as derived from a real-time frame buffer. The data from the frames are sequentially supplied to the plurality filter, which generates a corresponding sequence of output frames of the same format and timing, with the individual pixels having been processed by the plurality filter to provide an enhanced and improved output frame sequence, in real time.

Each frame may typically be formed of 512 rows of pixels, each row containing 512 pixels. Each pixel typically consists of an 8-bit data byte or word representing the value (e.g. intensity or brightness) of the corresponding particular point in the image. In such video display or other real-time data processing applications, the input or original video data is typically presented sequentially at the rate of 30 frames per second, corresponding to about 125 nanoseconds per pixel for a 512-by-512 pixel system. An apparatus which digitizes, stores, transmits and displays video images such as the original frames is the PCVision system, manufactured by Imaging Technologies Inc.

FIG. 1 depicts pixels A, B, C, D etc. presented in left-to-right order in each row. The rows of pixels are then presented in sequential order from top to bottom. The data flow in such a system consists in the sequential input of pixel values from the input frames to the plurality filter and the sequential output of corresponding but modified data to constitute pixels for the output frames, of the same sequence, timing and format, almost unnoticeably delayed in time by the duration of a few pixels.

The present invention may also be used in non-video environments, replacing the input video frames by data files or memory contents, whose data elements are presented sequentially, and which if desired may be arranged in similar row and column arrays. The system may be implemented in software, firmware, hardware or combinations of them.

General Operation

In general, the plurality filter of the present invention replaces each target pixel value by a new value which represents a consensus of values in a window of pixels which surround the target pixel. This consensus value is generated by constructing a restricted histogram of values of pixels in the window and choosing the value of the maximum-population bin of the histogram for the output pixel value. The restriction on the histogram consists in limiting the number of bins by selecting only a few of the most significant bits of pixel value rather than using the full data. This causes each bin to represent a sub-range of pixel values, and improves the degree to which the maximum-population bin actually represents the neighborhood. It completely eliminates the need for rank-sorting of data, which has been a necessary process in prior art.

A detailed example is given below, referring to FIGS. 2, 3 and 4. Specific illustrative choices of parameters were made to clarify the explanation, but it will be understood that other parameter value choices may be made, as desired. For example, 8-bit input data with four most significant bits ("MSB") would be reasonable in application, but would require 16 bins and 256 rows of binary levels (as described below with respect to FIG. 3B and FIG. 4). To avoid complicating the drawings, which might obscure the description of the concepts, the embodiment illustrated in FIGS. 2, 3, and 4 describes the operation of the plurality filter algorithm for an exemplary simplified specific choice of filter parameters, namely a one-dimensional window size of 11 pixels, whose data value has 3 binary bits, and using four histogram bins representing two most significant bits of input data. A more general case is indicated following description of this illustrative example.

Figure 2:
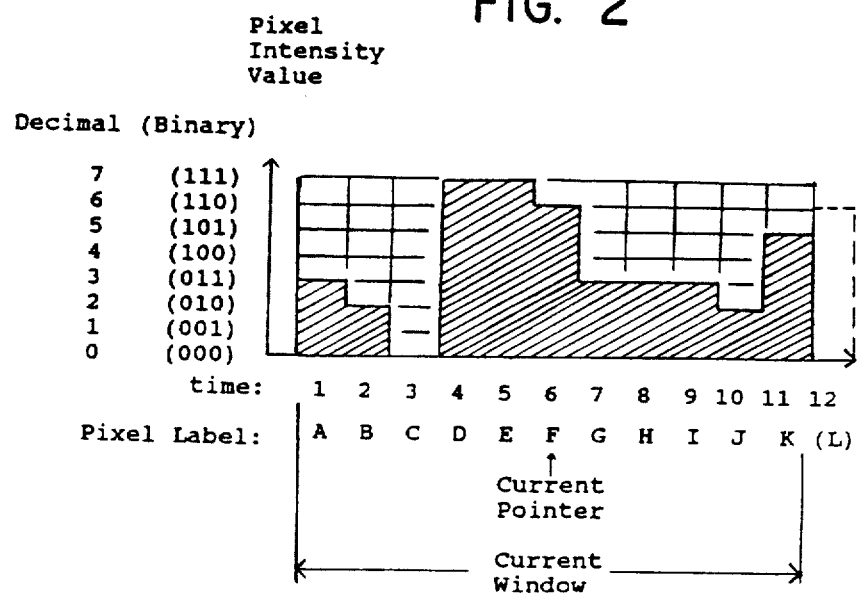
FIG. 2 shows a graph of an example of the intensity values of pixels versus various pixels scanned over time within a current window.

FIG. 2 illustrates the pixel data (i.e., data element) stream entering the plurality filter from a digitized video signal or from a frame buffer, or other signal source, as illustrated in FIG. 1. The horizontal axis indicates a set of successive pixels A to L, occurring at pixel transmission times 1 to 12. For a one-dimensional window which is eleven pixels wide, pixels "A" to "K" are within the window. The center pixel "F" is designated as the target pixel or current pointer. The vertical axis in FIG. 2 represents the digitized intensity of the data item (pixel value) of the respective pixel. The column headed "Decimal" shows the relative decimal pixel value, from 0 to 7, digitized in the column headed "Binary" to extend from binary 000 to 111. FIG. 2 depicts data which is illustratively digitized to three bits of precision, which simplifies the diagram. In practice, as much as eight bits per value are often used in frame buffers and digitized imagery.

The horizontal axis also represents time. A single time unit on this axis represents the pixel clocking time for the input, typically about 125 nanoseconds for a medium resolution video display driven by a standard RS-170 video signal. Thus, at time 1, pixel "A" (whose value is 3 or binary 011 in the figure) is transmitted into the plurality filter system; at time 2, pixel "B" (whose value is 2 (or binary 010 in the figure) is transmitted to the plurality filter system, and so forth for following pixels.

The pixel data is processed by the plurality filter system as follows. The neighborhood of consensus, or "window" in this illustrative example, is assumed to be eleven pixels wide, encompassing pixels "A" to "K" at the moment shown. The middle of the window corresponds to pixel "F", whose value (which is 3 originally) will be replaced by a consensus of the values of pixels "A" through "K" in the following way.

A histogram is constructed for the pixels of the window, as illustrated in FIG. 3. As is known in the art, histograms are tabular representations of the frequency distribution for a given group of data. This histogram is made up of a number of bins, each of which is assigned an address. FIG. 3A lists the binary values of the pixels "A" to "L" graphed in FIG. 2. Each pixel value in the window is stripped of its least significant (i.e., rightmost) bits (one bit in this example); the remaining most significant bits (two in this example) are used as bin addresses for the histogram, which is illustrated in FIG. 3B. In this example there are four possible values of bin addresses, since the eight possible pixel values of FIG. 2 are reduced by a factor of two by eliminating the least significant bit of the binary number representing the pixel value. These four bin addresses are shown along the horizontal axis of FIG. 3b and designated as the bin number. In this way, each bin corresponds to and its count includes more than one pixel value, namely, a sub-range or group of pixel values of a size corresponding to the stripped-off bits of the pixel value. In this example, one bit was stripped off, which could have either of two values. Therefore, each bin counts the pixels having two possible values (0 or 1) in its least significant bit. For example, bin 01 includes both pixel "A" (value 011) and pixel B (value 010). If two bits were stripped off, each bin would include $2^2$ or four pixel values, and so forth. Accordingly, bin "00" includes those pixels having intensity values from binary 000 through 001. Similarly, bin "01" includes those pixels having intensity values from binary 010 through 011; bin "10" includes the pixels having intensities ranging from binary 100 through 101; and the last bin "11" includes the pixels having intensity values ranging from binary 110 through 111. In a more general case, the number of bins would equal $2^m$, where m is the number of most-significant bits used. A choice of m equal to 2 to 5 is considered optimal.

From the pixel values listed in FIG. 3A it will be seen that pixel "C", whose value is binary 000, contributes one count to bin 00. Pixels "A", "B", "G", "H", "I", and "J", whose leftmost two bits are each 01, contribute one count each to bin 01. Pixel K contributes one count to bin 10, and pixels "D", "E", and "F" contribute one count each to bin 11.

From the histogram in FIG. 3B, it is seen that bin 01 contains the highest count. Thus, the plurality (meaning the most populous category, as in the terminology of electoral politics) of the eleven pixels in the window has 01 as their most significant bits. Therefore, the output value of the filter is made to consist of a digital value whose two most significant bits are 01. Least significant bits are replaced with zeros to restore the scale to that of the original data. Thus, the consensus value, 010, is the output value for pixel "F" in place of its original value 110. FIG. 4 shows the output from the plurality filter, where the output value 010 is assigned to the target pixel "F", at the center of the window. In the operation indicated below, the data illustrated in FIG. 4 are supplied to an output frame in a position exactly corresponding to its position in the input frame, e.g., position "F" in line j of the input frame corresponds to position "F", line j, of the output frame in FIG. 1.

In this way, a single pixel, namely "F", has its value replaced by a consensus of the values in its surrounding window.

To move to the next pixel, namely "G" in FIG. 2, the window is then moved one pixel to the right. That is, pixels labelled "B" through "L" centered at pixel "G" now constitute the window, in place of pixels "A" through "K" which constituted the window surrounding pixel "F". Pixels "B" through "K" remain common to both windows. Thus, the window is updated by dropping pixel "A" and adding pixel "L" in FIG. 2. The histogram of FIG. 3 is updated by decrementing (by one) the bin whose address corresponds to the value of "A" and incrementing (by one) the bin whose address corresponds to the value of "L". That is, in FIG. 3B, bin 01 is decremented and bin 11 is incremented. The replacement value for pixel "G" is derived from the value (address) of the remaining maximum-population bin exactly as described above. The phantom block at position "G" in FIG. 4 illustrates that the corresponding output of the plurality filter for pixel "G" is 2, i.e. 010 in binary notation. The value of output pixel "G" remains the same as for pixel "F", since the same bin has remained the most populous one.

The process above is repeated for pixels "H", "I" and so forth along an entire line of image data. As the window moves along the line each of the pixel values at the center of the window is replaced by its respective histogram consensus as described above. It will be seen that the length of the window does not affect the complexity of processing; one bin is incremented and one decremented no matter how long the window is chosen to be. Thus, the plurality filter is much more efficient than median-like filters, which generally require ranksorting for each target pixel, a process which increases in complexity as window size is increased.

The preceding description covers the filtering process for the normal situation where the entire window lies completely within the boundaries of the data line being processed. At the beginning of a data line, there are not enough neighbors on the left (or on the right for end of line) to contribute to a full window. For example, in FIG. 2, "A" has no left neighbor and "B" has only one, and so forth. Nevertheless, the replacement (filter output) values corresponding to these pixels may be derived in the same way, simply by constructing the histogram from those neighboring pixels which are within the window, even if less than eleven in number. For example, the 11-wide window centered at pixel "A" consists of "A" and its five rightmost neighbors, namely the set "A", "B", "C", "D", "E", and "F"; leftward neighbors are not within the screen. The histogram for "A" thus receives contributions from only six pixels, the histogram for "B" receives contributions from seven pixels ("A", "B", "C", "D", "E", "F", and "G") and so forth. Similarly, on the right end of the line of pixels, the number of contributions to a histogram declines as the right end of the processing window steps beyond the data line. Technically, the width of the windows at the extreme right and left ends of the data stream may be considered smaller than the full width, but the processing procedure is the same in all such cases, and a valid plurality vote results from the process by ignoring undefined pixels. That is, a bin is incremented when a pixel value corresponding to its address is added to the "front porch" (new pixel at the leading edge of the window) and a bin is decremented when a pixel value corresponding to its address is taken away from the "back porch" (trailing edge of the window). Porches which extend out beyond the data line are simply not processed and therefore do not contribute to the plurality vote.

Figure 5:
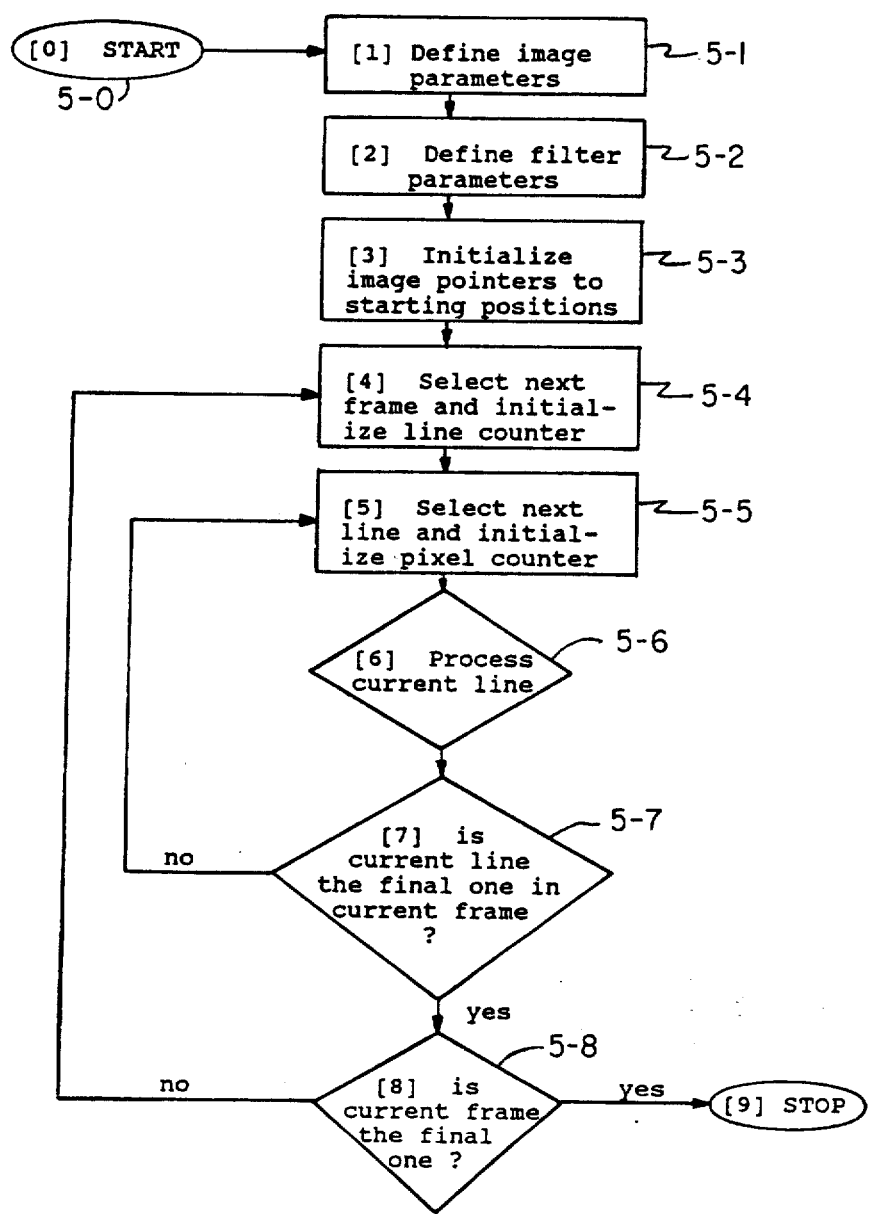
FIG. 5 is a flow chart showing a data processing sequence according to the present invention.

The process just described is illustrated in the flow chart of FIG. 5, which shows a general flow chart of the data processing, showing the sequence and control of the flow of data into and out of the plurality filter, where each block represents a step or group of steps of the operation. This flow chart may be executed in software by treating image frames as arrays of data, or in real time by hardware synchronized to the timing of video image data by synchronizing signals, such as line synch and frame synch signals.

In FIG. 5, block 5-0 represents the start of the operation. In block 5-1 image parameters are defined. For a software system, this would comprise defining data arrays corresponding in size, organization, and data type to the sequence of display frames. In a hardware embodiment, this step would correspond to the construction of a particular frame buffer memory, and the definition of its timing, control, and communication circuits, and the initialization of registers and switches.

In block 5-2 filter parameters are defined. These include the window type and size, and the number of most significant bits ("MSB") of the data to be used in construction of the histogram bins in the plurality filter. The term "window" here refers to a contiguous set of pixels. The size of the window is the number of pixels in the set, which may be one-dimensional (in a line) or multi-dimensional (e.g., a two-dimensional array or matrix). In a software system the step in block 5-2 would comprise defining pixel pointer offsets corresponding to window size, and defining an array which would function as a histogram. In a hardware embodiment, defining the window would corresponding to defining the structure and sequencing of a FIFO (first-in, first-out) shift register or stack which holds the data from a window, and setting up a group of hardware counters which will function as the histogram bins. Details will be seen in a description of hardware given below.

Block 5-3 comprises the initialization of pointers to a starting point just before the beginning of the image data, namely, the top left pixel of the first frame. In a software implementation, pixel, frame, and line pointers would be set to 0. In a hardware implementation, all timing and control signals would be reset.

Blocks 5-1 through 5-3 correspond to configuration definition and signal initialization steps. Blocks 5-4 through 5-8 correspond to the control and sequencing of the flow of data through the plurality filter.

Block 5-4 indicates selection of the next frame. In a software implementation, this would be achieved by incrementing a pointer to the next image array. In a hardware implementation, a frame synch signal would occur.

Block 5-5 indicates selection of the next line. In a software implementation, this would be achieved by incrementing a pointer to the next row of a frame array. In a hardware implementation, a line synch signal would occur.

Figure 6:
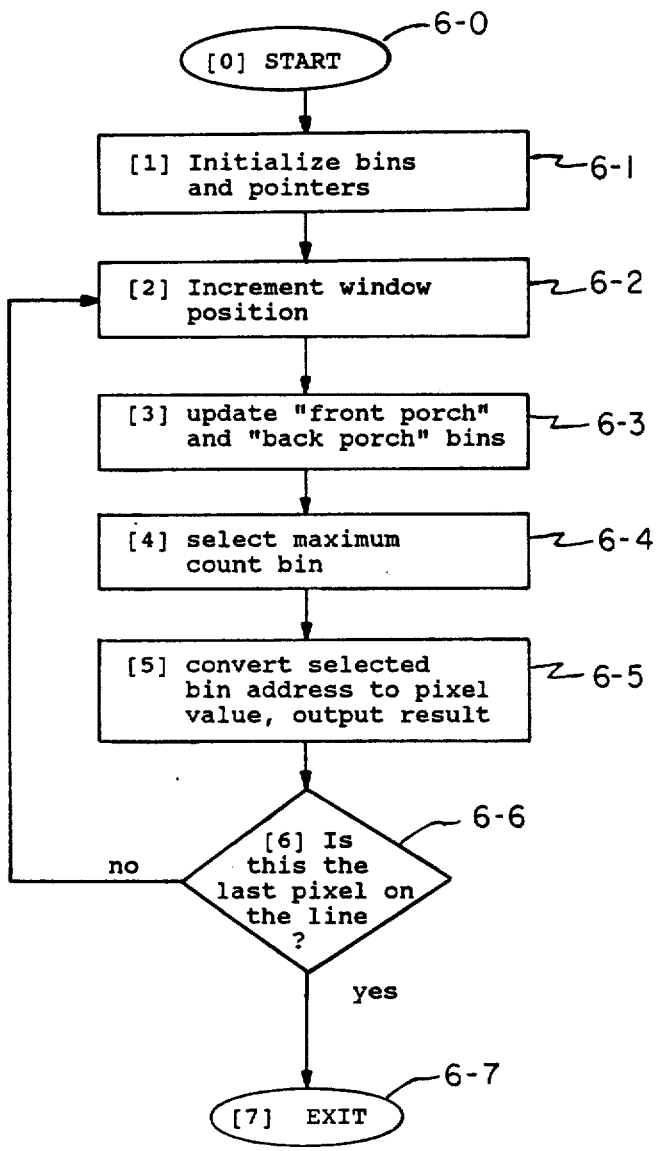
FIG. 6 is a flow chart showing an algorthm according to the present invention.

Block 5-6 indicates processing of the current line, i.e., by application to the plurality filter. Blocks 5-7 and 5-8 provide looping to the next line after last target pixel of a line, and to the next frame after the last line of a frame. The order of processing will be seen to be nested in typical video frame sequence, namely, pixels within a line as the innermost loop and then lines, then frames in successive outer loops. The sequence of processing indicated in the flowchart of FIG. 5 and the data sequence diagram in FIG. 6 are purely conventional and are described here only to provide a more ready understanding of the detailed discussion of the invention.

The preceding paragraphs have described the context of operation of the plurality filter in a typical application of the invention to a video image data stream. The following describes in more detail an example of the operation of the plurality filter according to the invention, providing the details of block 5-6 of the flowchart illustrated in FIG. 5 and the operations within the block labelled Plurality Filter in FIG. 1.

Plurality Filter Algorithm

The general operation of the plurality filter of the invention includes the ability to select different filter parameters. The flowchart in FIG. 6 illustrates the process flow of the basic algorithm, expressed for a general choice of parameters. The sequence of steps portrayed in this algorithm, and means for executing such steps efficiently, are important aspects of the novelty of the invention. The flowchart of FIG. 6 represents a more detailed expansion of the process depicted by block 5-6 of the flowchart of FIG. 5.

Referring to FIG. 5, block 5-2 refers to defining filter parameters, which are pre-selected either by the operator, or by the hardware designer, or by an external application computer program, depending on the implementation and application system. The filter parameters which are preselected in this way are "m", the number of most-significant bits of the g bits of the input data which are to be used in the plurality filter processing, and "w", the window width, which is the number of pixels which contribute to the definition of an output pixel of the plurality filter. The implications of these choices for subsequent processing are:

(1) "m" most-significant bits of the input data are selected for processing. This dictates that $2^m$ bins are to be used for this histogram. In the example of FIGS. 2, 3, and 4, the pre-selected value of "m" is two, so that $2^2$ or four bins are used in the histogram. Values of "m" in the range from two through five are reasonable for most applications. Values of "m" in excess of five would yield so many bins that data would be sparse and the maximum-population bin might not be representative of the pixel values in the window, which would diminish the validity of the filter for the intended applications.

(2) A window of width "w" is pre-selected. That is, the value of the output of the plurality filter is determined by the values of pixels in the window which spans the current pixel and w/2 pixels to the left and w/2 pixels to the right of the current pixel. An odd value of w is required to make a symmetrical window. Even values (values divisible by 2) of "w" would skew the data by ½ pixel, which is harmless in most applications, but would complicate the description with distracting details. In the example illustrated in FIGS. 2, 3, and 4, the value of "w" is 11. Values of "w" ranging from 1 through 50 are reasonable in most applications.

The two pre-selection steps first described define filter parameters to be utilized during the operation of the plurality filter. In a software implementation of the plurality filter, these pre-selection steps would be carried out by defining array sizes, magnitudes of pointer offsets, and values of variables representing shift magnitudes. In a hardware implementation of the plurality filter these steps would be carried out by defining the number of data lines, counters, and the size of stacks, as described below.

FIG. 6 is an expansion of block 5-6 of FIG. 5. Each transition from block 5-0 through block 5-7 of FIG. 5 corresponds to one complete video line of output pixels being generated by the plurality filter. Each transition from block 6-2 through block 6-6 in the flow chart of FIG. 6 corresponds to the generation of a single output pixel of the plurality filter. In software embodiments, such transitions would correspond to incrementing indexes which point into rows and columns of data arrays. In hardware embodiments, such transitions would correspond to cycles of timing signals which access successive pixels and lines of pixels.

In block 6-1 of FIG. 6, histogram bins are initialized by first clearing to zero, then incrementing those bins corresponding to the data in the first half-window. That is, data from the "m" most-significant-bits of the first w/2 pixels are used to increment the bins initially, to prepare for determining the first output pixel. In the specific example given in FIGS. 2, 3, and 4, pixels "A" through "F" would be used to determine output pixel "A". This sets the stage to define output values for input windows centered in the first w/2 pixels. Even though the left end of the windows for these pixels is technically outside the data boundary (i.e. frame), valid values may be assigned by building histograms for those pixels which are present within the data boundary.

The following description for FIG. 6 corresponds to the processing steps for a one-dimensional window. In block 6-2 of FIG. 6, the pixel pointer is incremented by one. This defines the pixel chosen as the center of the window to be processed and the position of the output pixel corresponding to this window. For the first cycle, this is pixel "A". For the second cycle, this is pixel "B", and so forth.

In block 6-3, the pixel which is w/2 units to the right of the center of the window is selected as the "front porch", i.e. as the new member of the window as it is shifted one pixel to the right. The m most-significant-bits of the front porch data serve as an address to that histogram bin which is incremented by one to account for the addition of this new pixel to the processing window. Also in block 6-3 the pixel which is w/2 units to the left of the window is selected as the "back porch", i.e. as the member of the window which is to be dropped as the window is moved one pixel to the right. The m most-significant-bits of the back porch serve as an address to that histogram bin which is decremented by one to account for the loss of this pixel from the processing window as it moves rightward by one pixel.

In block 6-4 of FIG. 6, the bin containing the largest number of entries is selected as the one most representative of the window. This bin is the one which corresponds to the most significant bits (MSB) of the value of the pixels which contributed to that bin. The address of this bin is then copied into a data item which is subsequently padded with enough zeroes to the right to restore the scale to that of the original data. That is, if the original data contained "q" binary digits, "m" most-significant-bits of which are used to define histogram bin address, then "q-m" zeroes are padded in as least-significant bits to restore the original scale. In the examples illustrated in FIGS. 2, 3, and 4, the value of "q-m" is 1. The resulting padded value serves as the output of the filter, which replaces the value formerly existing for the target pixel in the center of the window in the output frame. This may be (but is not necessarily) at the same location in the window as that of the target pixel.

In a software implementation of the plurality filter the process of determining which bin is the maximum comprises comparing the count in the incremented bin against a reference register which stores the current maximum determined as the bins are successively incremented. The process of padding may be achieved by copying the address of the appropriate bin into a variable, then shifting a binary representation of that variable q-m places to the left. Other technique yielding the same result are obvious to those skilled in the art and may be used.

In a hardware implementation of the plurality filter, the process of determining which bin is the maximum consists in inputting bin counts to digital comparators, which compare against a register storing the current maximum. The process of padding is achieved by switching the binary address of the winning bin onto lines which connect to the "m" most-significant-bits of output data, with the remaining least significant "q-m" bits fixed at electrical levels corresponding to zero. This process is described in more detail in the section below describing a preferred hardware embodiment of the invention.

If the pixel at the center of the processing window is not the last one on the line of pixels, the flow loops back from block 6-6 to block 6-2, which moves the window one pixel to the right. If the pixel under consideration is the last one in the line, processing terminates; the flow exits through block 6-7 of FIG. 6.

Figure 7:
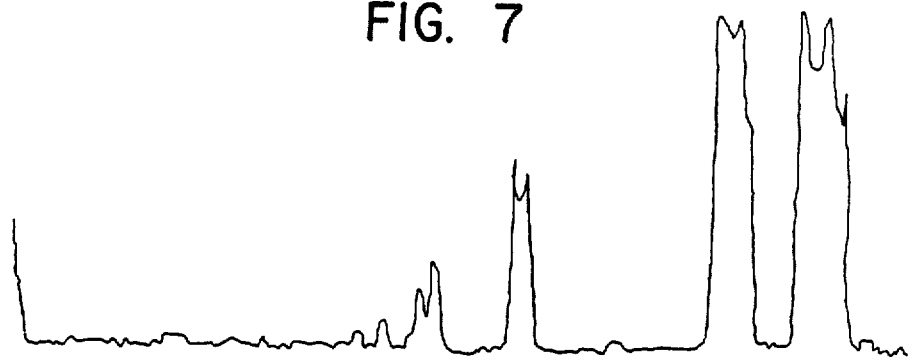
FIG. 7 shows a portion of a typical analog image signal received from a source of image data.
Figure 8:
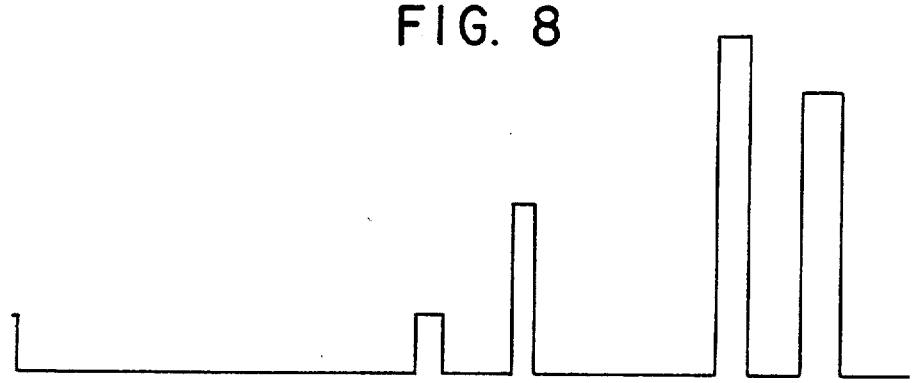
FIG. 8 shows the image data of FIG. 7 after processing through a filter system according to the present invention, in one illustrative embodiment.

FIGS. 7 and 8 illustrate the effect of the present invention on noisy video image data. FIG. 7 is a time plot of raw image data, such as a video analog signal, containing many irregularities such as noise at the base line and spiking on signal pulses. FIG. 8 shows the effect of using a plurality filter on the data of FIG. 7 (in this case with a one-dimensional window of 21 pixels and m=4). The processed waveform shown in FIG. 8 illustrates the non-linearity of the present filter, by the sharpening of the steps and the elimination of the spikes observed in the waveform of FIG. 5. A property of the present plurality filter embodiment is that pixel values representing less than that of a plurality of the population or neighborhood within a window have no effect. As seen, the data is smoothed, noise is eliminated, and a more faithful and usable version of the image data is obtained, including enhancing dominant features of the image, such as pulse width and height.

Figure 9:
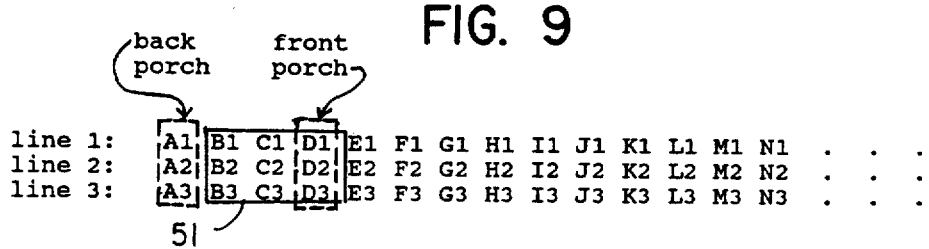
FIG. 9 is a diagram illustrating the pixels in a two-dimensional window, 3 pixels by 3 pixels in size.

The present invention is not limited to one-dimensional windows, but may be applied to two or more dimensions. In the case of a two-dimensional window, which consists of neighboring pixels in a rectangular region comprising rows and columns of the image surrounding the center target pixel, the "front porch" consists of a column of pixels at the right edge of the window, and the "back porch" consists of a column of pixels at the left edge of the window. FIG. 9 illustrates the front porch and back porch of a 3-by-3 window centered at C2. In the case of the two-dimensional window, block 6-3 of FIG. 6 corresponds to the following steps. All pixels on the front porch are used to increment bins individually in the same manner individually as the single pixel comprising the front porch of the one-dimensional window. Similarly, all pixels on the back porch are used to decrement bins individually in the same manner individually as the single pixel comprising the back porch of the one-dimensional window.

In the event that either the front porch or the back porch is outside the defined data or frame, i.e., at the beginning or end of the line of rectangle of pixels, no change is made in the histogram for such entries; only the other porch produces any change.

Figure 10:
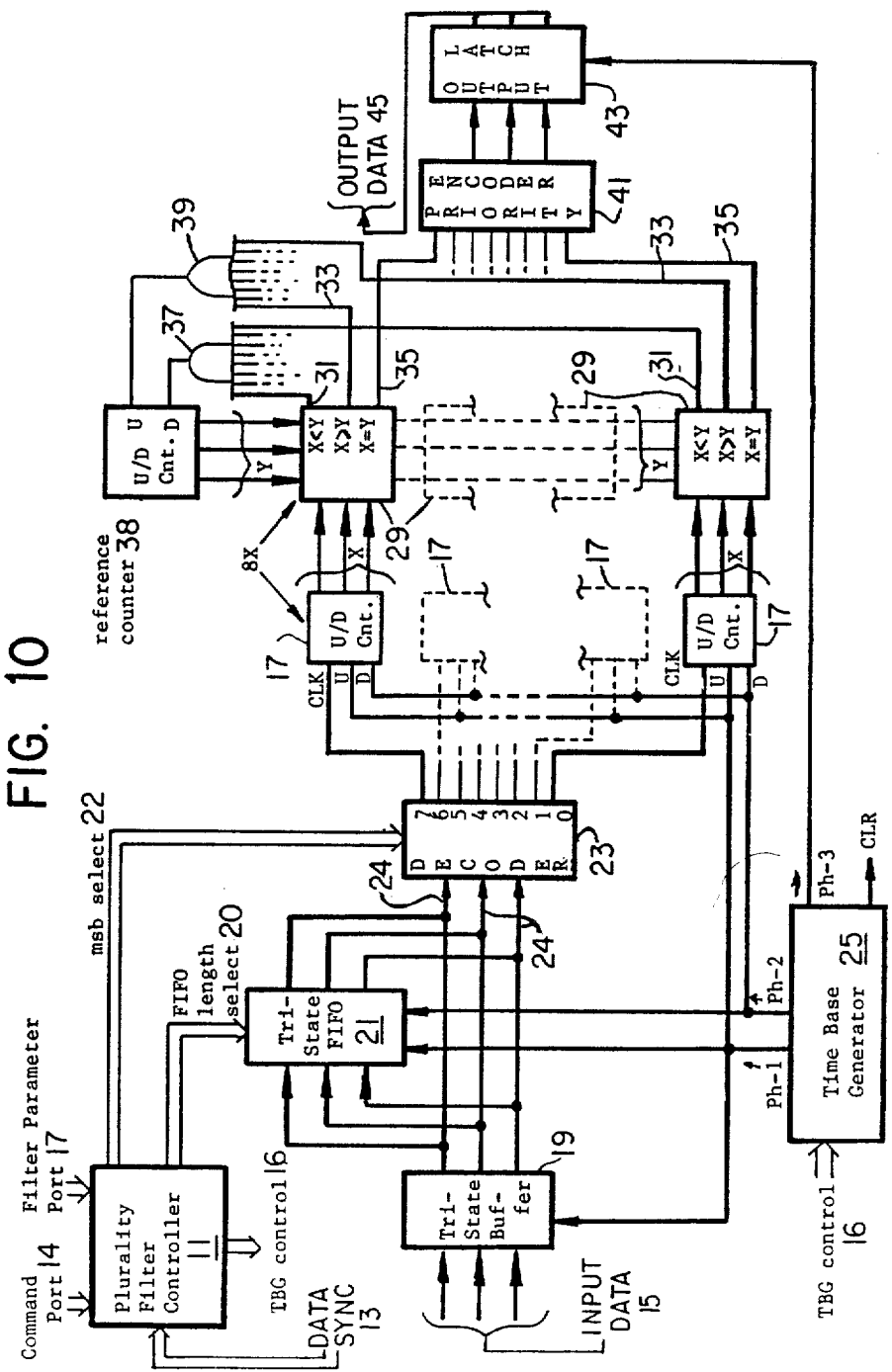
FIG. 10 shows a logic block diagram of apparatus according to one embodiment of the present invention.

FIG. 10 is a block logic diagram for a hardware version of a plurality filter according to the present invention. The filter is under the control of plurality filter controller 11 having a data synch input 13, a command port 14 for inputting command signals, and a filter parameter port 17 for setting system parameters. The controller 11 has a most-significant-bit (MSB) selector circuit shown in more detail in FIG. 11 which provides an MSB select output 22 as described below. Controller 11 also has a FIFO length select circuit shown in FIG. 12, providing a FIFO length select output 20 as described below. Controller 11 may be implemented as a single gate array chip such as No. XC 2018-70 manufactured by Xilinx, configured to coordinate the external interfaces in the manner described below.

Controller 11 also includes a time base generator control which controls a time base generator (TBG) 25 over interface 16, in the manner described below. TBG 25 has outputs Ph-1, Ph-2, Ph-3 and CLR, described below.

Input data (e.g. from a video frame buffer or other data source) is supplied at 15 to a tri-state buffer 19. Three input lines are shown, corresponding to three bits determining the input data intensity or gray scale value of each pixel in the illustrative example given above. For other numbers (q) of data bits, the input 15 will have a corresponding number (q) of lines. Eight bits (q=8) would be typical for a black and white vide image. Buffer 19 may be implemented as a 74125 chip manufactured by Signetics.

Buffer 19 is controlled from (enabled by) output Ph-1 pulses from TBG 25 and supplies concurrently a tri-state FIFO (first-in first-out) shift register/data buffer 21 and a decoder 23. As will be seen below, FIFO 21 has a number of stages set by the circuit of FIG. 12 to equal one more than the chosen number of pixels in the window for the one dimensional case. This circuit is controlled by FIFO length select output 20 from controller 11. FIFO 21 may be implemented in a single Xilinx gate array XC2018-70 chip. Decoder 23 is controlled by MSB select output 22 from controller 11, and may be implemented as a single Signetics 74154 chip for distributing pixel data to the appropriate number of histogram counter bins 17. The bins 17 are formed of up/down counters which may be implemented as Signetics' 74191 chips, illustrated as four in number in the one-dimensional example described above.

In general, the capacity of each counter 17 should be sufficient to hold the number of pixels in a window. In an extreme case, with a window size w=128 and m=4 bits, each counter should have the capacity to store a value of $128 \times 2^m = 2048$. A counter of 11 bits would suffice in this case.

It will be understood that, where desired, the arrangement described above may be organized to serve alternatively as a plurality filter according to FIG. 10 or a majority/heterogeneity filter as in FIG. 17, described below.

Each bin counter 17 is controlled by timing signals Ph-1 and Ph-2 from TBG 25, and each is connected to an input of a respective comparator 29 also having an input from a reference up/down counter 38 (e.g. a Signetics 74191 chip). Each comparator 29 compares input X from a respective bin 17 with an input Y from the reference counter, and provides an output on lead 31 if X is less than Y. The X<Y (X less than Y) output for each comparator 29 is connected by lead 31 through a common AND gate 37 to the "down-count" input D of the reference counter 38. The X>Y (X greater than Y) output from each comparator 29 is connected by lead 33 through a common OR gate 39 to the "up-count" input U of reference counter 38. The X=Y output of each comparator 29 is connected by lead 35 to the input of priority encoder 41 (e.g., a Signetics 74148 chip), whose output supplies an output latch 43 (e.g., a Signetics 74154 chip). Latch 43 supplies output data on lines 45, under control of TBG output Ph-3.

Operation of the Exemplary Embodiment

The controller 11 is a digital control system consisting of conventional registers, gates and other logic circuits for performing the functions of responding to external commands, filter parameter data and data synchronizing signals, to provide the control and timing signals which set up and coordinate the actions of the components of the plurality filter. Controller 11 serves two major functions. First, it coordinates timing and data access between the plurality filter and its external data inputs and outputs. Second, it flexibly configures the internal operation of the plurality filter to accommodate the window size "w" and MSB number "m" set into the system for use in processing.

Coordination of timing and data access is achieved by means of data synch signals 13. For image data these comprise line synch and frame synch signals provided by an external source, such as a frame buffer or video signal. Such signals are in synchrony with address lines controlling memory access to image data in a frame buffer, as is conventional.

Controller 11 sends TBG control signals via bus 16 to TBG 25 to synchronize internal processing with the appropriate image data inputs and output. These control signals in a conventional way produce master clock or timing signals, shown at 51 in FIDS. 13A, 13B and 13C described below.

The command port input 14 to controller 11 receives external signals which cause controller 11 to initialize, run, stop and modify the operations of the plurality filter. This port 14 may be a conventional digital data port receiving inputs from a system host computer or an operator terminal or other digital hardware.

The filter parameter port 17 is a similar means which receives signals representing selected values of the parameters "m" (most significant bits) and "w" (window length).

Figures 11, 11A, 14:
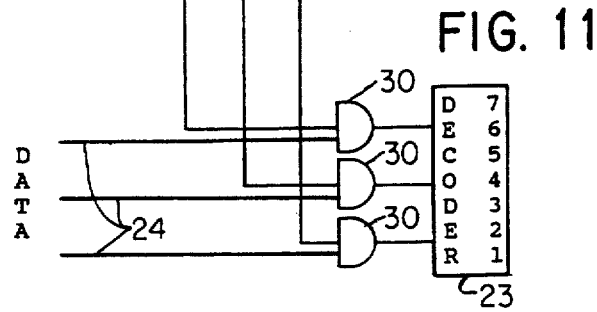
FIG. 11 shows a logic block diagram for a most-significant-bit select circuit useful in the present invention.
FIG. 11A shows a mask used with FIG. 11.
FIG. 14 shows a diagram of the contents of the FIFO register at various stages of the operations of an illustrative embodiment of the invention according to FIG. 10.

The set-in value of "m" acts via lead 22 to mask out and suppress the chosen number of least significant bits of the input digital data. In the exemplary system of FIG. 10, the system can accommodate a maximum of three MSB, via the three lines 18 for data passing between tri-state buffer 19 and decoder 23, so that "m" may be 3 or 2 or 1 in this example The circuit connecting leads 22 to the decoder 23 includes a MSB select circuit connected to the leads 24 at the input of the decoder 29, one form of which is shown in FIG. 11. This MSB select circuit may be part of decoder 23. It is formed by an AND gate 30 in each data line 24, a second input to each AND gate 30 coming from the MSB select line 22. FIG. 11A shows the effect of the control by the MSB select leads 22. If m=3, all three MSB leads are set at "1", making an input mask of 111. If m=2, the mask is made 110. If m=1, the mask is 100. Any lead on which zero level is imposed from MSB select 22 will have only zero bits passing through. This "0" is imposed on each AND gate 30 for which the bits are to be suppressed, as being least significant. The effect is to make zero or mask out the bits designated. The controller 11 places the appropriate values on leads 22 to accomplish the desired bit-stripping. It will be understood that other known forms of bit-stripping may be used to suppress the desired number of least-significant bits, and the arrangement may readily conform in similar manner to larger numbers than m=3 where desired.

A second function performed by the parameters set into the controller 11 is to determine the number of stages or stack length of the FIFO shift register 21, to permit it to store all image data between and including the front porch and the back porch, that is, to accommodate data for w+1 pixels. FIG. 12 shows a circuit which effects adjustment of the FIFO length.

The blocks 32 represent n successive stages of the shift register 21, each stage forming a latch holding the data for the value of one pixel, namely, three data bits in the illustrative example being described. While for explanatory purposes only four stages are shown, it will be understood that there will be enough stages so that the circuit can be set by the controller 11 to make w+1 stages (one more than the window size) operative, as follows. The Ph-1 signal supplied to all stages 32 induces a simultaneous right-shift of the data in each stage 32 into the successor stage. The blocks 34 are tristate gates, each of which enables or disables passage of data from its associated stage 32 to the decoder 23, via data-out leads 36. The controller FIFO length select 20 supplies the mask shown at FIG. 12A which selects a single stage at a time for passage to the decoder, under control of Ph-2 pulse signals. Such tri-state gates 34 have data lines which may be in one of three states, namely "0" (such as low voltage), or "1" (such as high voltage), or the third state which is high impedance, where the line is effectively disconnected, and can therefore be set by another device. Each gate 34 is controlled by the output of a respective AND gate 38, to which is supplied the FIFO length select control signal over line 20, and also timing pulse Ph-2. Only one control line 20 has a "1" set into an AND gate 38, corresponding to the last gate 34 (i.e., the 12th gate in the example described) which receives data from the FIFO stage corresponding to the "back porch" of the window. The other inputs for all AND gates 34 come from Ph-2, so that only during Ph-2 can the data output from the last stage 32 of FIFO 21, 22 reach the tri-state gate 34, to permit it to pass data to the output 36 and thence to the decoder 23. The mask of FIG. 12A assures that only the selected last stage 32 at any time passes its data to the output.

Figure 13A:
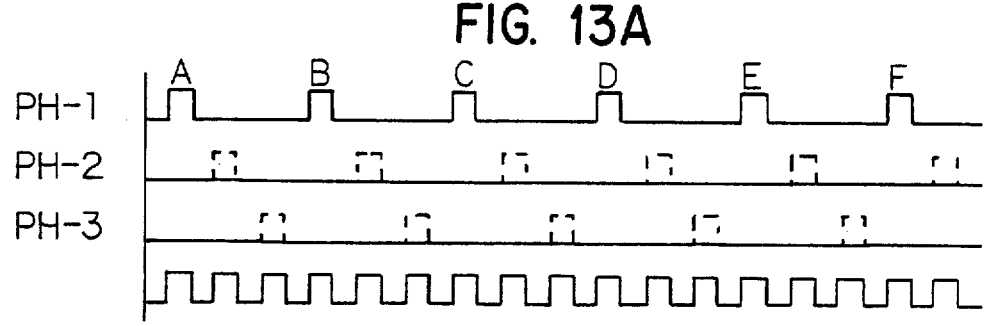
Figs. 13A, 13B and 13C show timing diagrams of signals for operating the logic circuit of FIG. 10, according to one embodiment of the invention.

The TBG 25 sends four sets of control pulses out to the internal components of the system, namely Ph-1, Ph-2, Ph-3 and CLR. Only one pulse occurs at any moment. The relative timing of these signals is shown in FIGS. 13A, B and C. Referring to FIGS. 13A, B and C, the master clock pulses shown in the top line controlled by controller 11 or are provided by the controller 11 to TBG 25, by way of TBG control leads 16. The Ph-1 pulses occur in synchronism with every third clock pulse. The Ph-2 and Ph-3 pulses also occur at every third clock pulse, but time-displaced, so that each Ph-2 pulse is displaced by one master clock pulse from a Ph-1 pulse and each Ph-3 pulse is displaced by one master clock pulse from a Ph-2 pulse. The CLR signal is used upon initiation of processing a line of data, to clear all counters to zero (its connection to the individual components is omitted from the figure to avoid clutter and confusion).

The Ph-1 pulse signal enables input of data from buffer 19 to decoder 23 and to FIFO register 21, at the occurrence of each pixel, and simultaneously enables an up-count in the histogram counter 17 selected by decoder 23. This increments the histogram bin 17 whose address corresponds to the pixel value.

The Ph-2 pulse signal enables the output of back-porch data from the last stage of the FIFO stack 21 to decoder 23. Simultaneously the up/down counter 27 selected by decoder 23 is down-counted. This decrements the histogram bin 17 corresponding to the back-porch pixel value (if present).

The Ph-3 pulse enables the output latch 43 to cause the encoded address of the maximum-population histogram bin 17 present in the priority encoder 41 to pass to the output 45, such as a video frame buffer. The priority encoder 41 provides two functions. The first function is to encode the incoming histogram bin line into an address corresponding to gray-scale image values, that is, into a binary number having the same number of bits as the originally received gray-scale binary data, by shifting the bits of the histogram address, equivalent to the insertion of zeros to replace the deleted least-significant bits.

The second function of priority encoder 41 is to pick the bin counter 17 having a value corresponding to the highest intensity value, when more than one bin counter 17 has a count corresponding to the maximum bin count.

The priority encoder 41 receives an input from each comparator 29 lead 35 which, by comparing the output of each counter 17 with that of the reference counter 38, has determined that the count of its respective counter 17 is equal to the total count of reference counter 38. If there is only one input, then the encoder 41 passes the bin address of that input, supplemented by "0" bits replacing the previously suppressed least significant bits. If more than one counter 17 has a count equal to the count of maximum counter 38, then encoder 41 selects the largest bin address of those bins having that maximum count, and passes it on to latch 43 after inserting the least significant bits.

Output latch 43 thus retains the modified pixel data for the target pixel until the Ph-3 pulse releases that data to output 45 as the reconstituted target pixel, such as illustrated in FIG. 8.

An alternative embodiment for the just illustrated plurality filter system of FIG. 10 may use a gate array. In such an embodiment, the intensity value of each pixel in the current window is supplied to a respective input of a gate array. The output of the gate array is made equal to the most frequently occurring received pixel intensity value. Accordingly, such an alternative embodiment would provide much greater processing speed. However, a disadvantage is that the window size is restricted by the number of input registers and gates available in the current state of technology for gate arrays.

If the processing window is one-dimensional, each of the advancing and trailing edge data consists of one pixel. Window width corresponds to the difference between addresses of leading and trailing pixels accessed by the controller 11. In this example, the use of an input or source frame buffer is unnecessary, for the reason that the plurality filter can be operated to process the image data at scan rates. Also, an output or destination buffer would also be unnecessary, in that filter data could either be displayed, thresholded, or runlength encoded directly. Thus, video signal input could be digitized, plurality filtered, and converted back to video at video rates without any external image storage. If the window is a two-dimensional pxp square, there are p pixels on each of the leading and trailing edges of the associated window. Buffering of p scan lines is required in this case. In this latter application, incremental computation must be carried out by the plurality filter, which requires p count-up and p count-down steps through use of a logic network as in FIG. 10 and the associated clock signals of FIG. 13. In such case there would be p Ph-1 and p Ph-2 pulses for each Ph-3 pulse.

The logic network of FIG. 10 may also be modified to provide an alternative embodiment in which a lookup table is substituted for the encoder distributor 23, in the path of the incoming data. The outputs of the lookup table point to the bins or counters 17, rather than the most significant bits of the pixels, as in the previous embodiment. Such case of a lookup table would increase the flexibility of the illustrated plurality filter.

For 3-D data in windows, such as associated with volume data cells (VOXELS), from computer assisted tomography (CAT) scans or OCTREE data, leading and trailing edges consist of pxp VOXELS, and similar scaling and buffering requirements as indicated above are used. Regardless of the dimensionality of data in the window, after the trailing data is used to update the reference counter 38, the data are transferred to the output latch 43, where the data constitutes the m most-significant bits. As previously explained, less-significant bits not utilized in the filtering are set to zero. In other words, the filter data output is scaled to the same level as the original image input data by making the (q-m) least significant bits all 0.

Description of Sequence of Operation

1. Initializing Filter Configuration

The following paragraphs describe in detail the sequence of operations involved in initialization of the plurality filter system illustrated in FIG. 10. Basically, initialization occurs in the sequence of operation corresponding to block 5-2 of FIG. 5. The purpose of initialization is to configure the masks in "msb select" lines 22 and "FIFO length select" lines 20 and timing functions of the TBG 25 to correspond to the choices of window size and MSB.

Referring to FIG. 10, the plurality filter system is initialized by sending it an initialization command through command port 14. The plurality filter controller 11 responds by going into an initialization state in which it is ready to accept configuration parameters. These parameters, which are now transmitted into the system through the filter parameter port 17, consist of window size, and number of MSB. The window may be specified as a rectangle with width "w" and height "h". If the window is one-dimensional, h=1. If the window is two-dimensional, h may be 2, 3, 4 etc., i.e., the number of rows within the window.

The value of "m" is processed within the plurality filter controller, for example by using a lookup table, to generate a mask which is loaded onto the "msb select" lines 22, which will remain so loaded for the duration of operation of the filter on the entire image. The function of this mask in selecting MSB is as illustrated in FIG. 11 and described above under "Operation of the Exemplary Embodiment".

The values of "w" and "h" input to the plurality filter controller 11 configure the tri-state FIFO register 21 via a mask as illustrated in FIG. 12 and also described above. FIFO length is set to h(w+1) to accommodate data in the window, plus a "back porch" of h pixels.

Figures 15, 16:
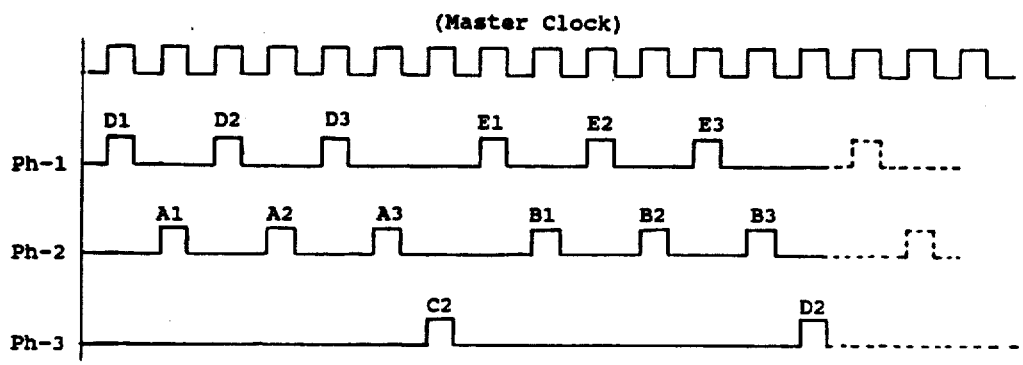
FIG. 15 shows a diagram of the contents of the FIFO register for an illustrative embodiment of the invention using a two-dimensional window.
FIG. 16 shows timing diagrams of signals for operating the logic circuits of FIG. 10 for a 3×3 window of data, according to one illustrative embodiment of the invention.

The values of "w" and "h" also are used to compute and set up the timing patterns illustrated in FIGS. 13 and 16. That is, at the commencement of a new line of pixels, Ph-3 delays "w/2" complete cycles and Ph-2 delays "w" complete cycles before starting, in the case of a one-dimensional window. In the case of a two-dimensional window, the sequence is slightly more complex, but straightforward. These setup computations may be carried out in the plurality filter controller 11 using simple adders and counters as is well known to those versed in the art of digital control.

The pre-selection of "w", "h" and "m" thus configures the hardware and sets up timing signal patterns upon initialization, to reflect the choice of window size and MSB count. The capability for such flexible choice of configuration is part of the novelty of the invention.

The system is now ready to initialize the histogram bins and process data, as now described.

2. Initializing Histogram Bins

Once the system has been configured as just described, a data synch signal (input via 13 in FIG. 10) indicates that a new line of data is ready to be processed. The plurality filter controller 11 then signals the TBG 25 to issue a CLR signal, zeroing all up/down counters 17 and the reference counter 38.

In the following example it is assumed that w=11, h=1, and m=2, as in the examples illustrated in FIGS. 2, 3 and 4.

Ph-1 is synchronized with the incoming data so that each Ph-1 pulse occurs simultaneously with a pixel, starting with pixel "A" (See FIG. 13A). Buffer 19 then passes the three bits of pixel A data to FIFO 21, to be stored in Stage 1 of FIG. 12. Concurrently pixel A data passes to the input 24 of the decoder 23, which determines that pixel A has a value 3 (binary 011), as shown in FIG. 2. Decoder 23 then selects the up/down counter 17 having address 01 (suppressing the least significant bit of the pixel value) which is also enabled by the Ph-1 pulse to increment its count to produce an "X" count in its output. In the respective comparator 29 this is compared with "Y" count from the reference counter 38 (initially reset to zero).

Since now X>Y, one of the lines 33 is enabled, which passes OR gate 39 to increment the reference counter to Y=1.

At this point pulses Ph-2 and Ph-3 are preferably suppressed at their source by TBG 25, as indicated by the phantom pulses in FIG. 13A. This is appropriate during initialization because no valid data yet exists in FIFO 21 or output latch 43.

The next pixel B occurs concurrently with the next Ph-1 pulse, which moves pixel A data to FIFO register stage 2 and stores pixel B data in FIFO stage 1. Decoder 23 again passes the pixel data (this time of "B" value 010) to the 01 up/down bin counter 17, whose count is incremented so that its X=2. Since Y now equals 1, X is greater than Y and again this increments the reference counter 38 to the value Y=2, without effect on the output 45.

Pixel C data will be input to buffer 19 on the next Ph-1 pulse. From FIG. 3 will be seen that the binary value for pixel C is 000. This data then passes to the FIFO 21 and the decoder 23. Again the decoder selects the up/down bin counter 17 corresponding to a stripped data value, now 00, which is now incremented to X=1. This value is also less than Y, so that OR gate 39 will not pass any signal. Moreover, not all of the bins have an X value less than Y (bin 01 has a value equal to Y in the present example) so that the AND gate 37 will not pass a signal. Accordingly, reference counter 38 remains at the same count Y=2.

At each Ph-1 pulse the bin having its X value equal to Y (that is, the maximum count value) has its address (i.e., maximum-count gray-scale value) supplied to the priority encoder, which continually adds to that address the previously suppressed least-significant bits as fixed zeros (as by shifting the bits leftward by the number of least-significant bits). Accordingly, the output of the priority encoder at any Ph-1 pulse is the address (gray-scale pixel value) of the bin having the maximum count to that moment. Should two bins or more have the same maximum count, then the priority encoder is arranged to pass only the one having the higher pixel value.

The same process applies for the succeeding pixels D, E and F, with the respective histogram bins 17 and reference counter 38 being incremented in the same manner described. FIG. 3B shows the count in each bin 17.

During this period, Ph-2 pulses have been suppressed by TBG 25, so there is no FIFO register output (see FIG. 12). This assures that invalid data initially in FIFO is not passed out to the system as "back porch" data.

Figure 13B:
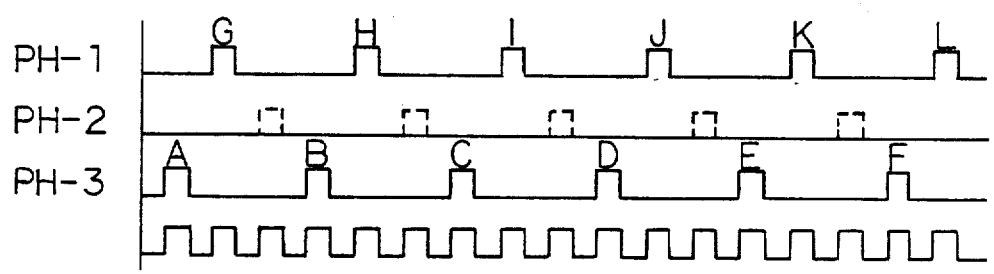

However, after the sixth pixel F has occurred (that is, after one-half of the window plus the target pixel have been stored in the FIFO) the first active Ph-3 pulse occurs, as shown in FIG. 13B. This Ph-3 pulse is marked "A" because it corresponds to the target pixel A which is being processed. When the output latch 43 is activated by the Ph-3 pixel A, it will pass to its output 45 the data then at the priority encoder, which correspond to the address of the highest-count bin resulting from pixels A through F. For this bin, X=Y. Its address, supplemented by the previously suppressed least significant bits, then becomes the value of output pixel A. The least significant bits may be re-inserted at the latch 45, if desired.

It will be seen that at this point output pixel A gives the maximum gray-scale count among only six pixels, forming the neighborhood of pixel A, since pixel A is at the left-most position in the frame and window.

Upon the arrival of pixel G data, the Ph-1 pulse again steps the FIFO to the next stage, again increments the appropriate bin 17, again determines whether any bin 17 now has a count exceeding the reference count Y. If so the reference counter 38 is incremented to provide a new value of Y; if not, the current value Y is maintained; again the address corresponding to X=Y is supplied to the priority encoder 41 and thereby to the output latch 43 (with re-insertion of least significant bits). The latch 43 is now activated by Ph-3 pulse B and provides the output value for pixel B.

This procedure is repeated until 11 stages of the FIFO 21 are filled with data, at which time the target pixel becomes pixel F, whose corresponding output pixel F is derived from all 11 of the input pixels A through K.

In this way, the first w/2 output pixels A through F are generated. The successive states of the FIFO register 21 during these steps are illustrated in FIG. 14, where each letter "A", "B", etc. represents the data for the corresponding pixel, and "x" represents no valid data, or zero.

3. Steady State Operation

When the next pixel L arrives at the buffer 19, and is supplied to the FIFO 21, Ph-1 steps the FIFO register to put pixel A data into stage 12, and adds a count to the appropriate bin 27. The first active Ph-2 pulse is now generated, designated A in FIG. 13C. This pulse is now operative in the system of FIG. 12 to cause the output of stage 12 of the FIFO 21 to be supplied to the output line 36.

This occurs because the FIFO length 12 set into the system causes the 12th AND gate 38 (in FIG. 12) to receive a "1" value at the same time as Ph-2 is received by gate 38. This then activates gate 12 to pass the data of stage 12, which at that time corresponds to pixel A. Decoder 23 then selects the bin 17 corresponding to the value of pixel A and the Ph-2 pulse is supplied to the down count input of that bin counter to decrement it by 1. This subtracts from the histogram the count corresponding to pixel A. If the bin thus down-counted has the maximum count, then X becomes less than Y, and all X's are less than Y. This operates through a comparator 29 and AND gate 37 to decrement reference counter 38, so again there is one bin with X=Y, to supply encoder 41 with a new value.

However, if the bin thus down-counted is not a maximum-count bin (or there is another bin with an equal maximum count) then another bin remains at the maximum count Y. Since not all bins have X<Y, Y is not decreased. Also, since no bin has X>Y, OR gate 39 is not activated. Reference counter 38 remains at the same Y value, and encoder 41 remains at its former setting.

Figure 13C:
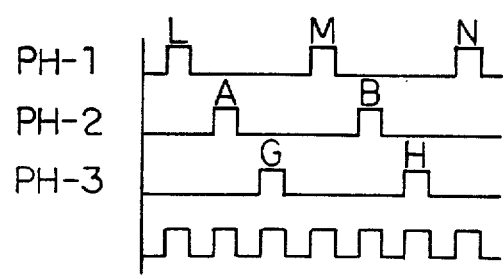

Thus pixel L count is added to the histogram in the same manner as previous pixels. However, one clock pulse thereafter, as shown in FIG. 13C, control pulse Ph-2, designated as A, subtracts from the histogram a count from the bin corresponding to the value of pixel A. Thus the count for pixel A is extracted from the histogram and the count for pixel L is added.

In this way, the histogram is updated by the count for value of pixel L and down counted for the value of pixel A. The result is the histogram for pixel G. On the occurrence of the Ph-3 pulse on the next clock count, the output latch 43 is activated to pass to the output a new value for pixel G, shown in dotted line in FIG. 4.

Processing of the pixels is continued in the same manner, by stepping the current pointer for the target pixel to the right, in this example, to the next occurring center pixel "H", and so forth, in successive order. In this manner, for each new pixel processed, another or incoming pixel from the right edge of the advancing window is brought within the domain of the window, and its contribution added to the appropriate bin. At the left edge of the window, which is incrementally advancing to the right, the left-most pixel which is now outgoing and not included in the window, has its contribution subtracted from the appropriate one of the bins of the histogram of FIG. 3. In a similar way, when the scanning arrives at the right edge of the frame, the histogram will not be upcounted by any pixels beyond the edge of the frame, but will be down counted by the "back porch" at each step, so that the final pixels of the line will represent neighborhoods of decreasing numbers of pixels until at the last pixel in the line of the frame, only the w/2 pixels to its left and that last pixel contribute to the histogram.

This operation of the filter is continued until the last pixel in the line is processed. In this way, contributions in the pixels due to spikes are filtered out, whereas step functions inherent in the actual image data are preserved or in effect enhanced, as illustrated in FIGS. 8 and 9.

In summary, Ph-1 pulses trigger processing of front porch data, Ph-2 pulses trigger processing of back porch data, and Ph-3 pulses trigger the output of a modified pixel, all as controlled by TBG, synchronized by the master clock signal which the controller 11 synchronizes with data synch signals.

Accordingly, from the example given for this one embodiment of the invention, the invention will be seen to include a plurality filter algorithm for constructing a histogram of simplified (i.e., with fewer bits) pixel values in a fixed neighborhood of the target pixel. The simplification process includes the elimination of a preselected number of least significant bits from the binary representation of the intensity value of each pixel. Accordingly, if m most significant bits remain for representing the intensity value of each pixel, the associated histogram will then include $2^m$ bins. As a result, if m is equal to 2, then 4 bins will be included in the associated histogram, or if m is equal to 4, then 16 bins will be included in the associated histogram, for example. A second step in the filtering process, as shown, is to replace the target pixel (the centermost pixel of a present window, in the example just given) with the address of the most populated histogram bin shifted g-m bits to the left (where g is equal to the total number of bits representing the intensity level of a pixel in the originally received image data, before simplification), for scaling the processed data back to the same scale (i.e., number of bits representing pixel intensity) as the pixels of the image source.

Accordingly, the plurality filter embodiment of the present invention resembles a voting process, where each pixel is replaced by a value more representative of the values of pixels within the predetermined neighborhood of the target pixel. While that neighborhood has been illustrated as constituted by 5 pixels on either side of the target pixel, and is in the same line, any desired neighborhood may be selected, whether on the same line or not. For example, 3 lines of 3 pixels (as shown in FIG. 9) or 3 lines of 11 pixels may constitute the neighborhood (i.e. window) with the target pixel (whose value is to be modified or regularized) at the center of such windows.

The elimination of least significant bits has the advantage of reducing the number of histogram bins required, that is, it reduces the variety of considered intensity values of pixels within the neighborhood being processed. If a large number of bins were used, the maximum bin (having the highest pixel count) may be a relatively poor representative of the neighborhood. In such instances, more complex processing would be required, such as finding the centroid of the histogram. This is avoided by the present invention.

The present invention thus provides relatively simple and high speed processing, in the reduction of local histogram data to a single pixel value. The present algorithm for achieving such plurality filtering makes the use of simplified logic configurations, via the provision of incremental processing of pixels without sorting or merging operations.

Two Dimensional Window Form

FIG. 9 shows within the solid rectangle 51 a 3×3 pixel window. In FIG. 9, three successive input image lines 1, 2, 3 are shown. Pixels A1, B1, C1 are the first, second, and third pixels in line 1, pixels A2, B2, C2 are the first, second and third pixels in line 2 and so forth. If the stream of pixels is generated sequentially, as by a video signal, means are provided for storing three consecutive lines represented in FIG. 9. This can be achieved by dumping the pixels into a 3 video line memory buffer preceding the tri-state buffer 19 of FIG. 10.

The pixel values are read out of the 3-line buffer to the tri-state buffer FIG. 10 in the order A1, A2, A3, B1, B2, B3 etc. The three line buffer is external to the plurality filter. In FIG. 1, this 3-line buffer would be contained within the structure of the input frames, either as a separate hardware buffer, in the case of video signals, or as an address access sequence for a full frame buffer.

FIG. 15 indicates the order in which these data items appear in the FIFO stack. In contrast to the 1- D window which had one pixel on its front porch and one on its back porch, the 2-D 3×3 window has 3 pixels on its front porch and three on its back porch, as illustrated by the dotted boxes so labelled associated with the target pixel C2 in the center of the current window, outlined in FIG. 9; that is, pixels D1, D2, D3 constitute the front porch and pixels A1, A2, A3 constitute the back porch of the window which is used to compute the output value of target pixel C2.

The process and means for generating the 2-D plurality filter are the same as described above for generating the 1-D plurality filter. The difference lies in the order in which pixel data is presented to the FIFO, and the sequence in which Ph-1, Ph-2, and Ph-3 are presented to control lines. Pixel data are presented in the sequence A1, A2, A3, B1, B2, B3 etc as indicated in FIG. 9. They are presented three times faster than video pixel rate, because three lines simultaneously contribute to the output of a single pixel. This is indicated by the two time scales indicated in FIG. 15. Video pixel cycles of 125 nanoseconds are shown in the left column of FIG. 15 which indicates the sequence of output pixels, while input pixel data (and Ph-1 pulses) must therefore be presented at an average rate of about 40 nanoseconds from the 3 line buffer to the tri-state buffer of FIG. 10, as indicated in the second column of FIG. 15. FIG. 16 illustrates the timing sequence to be output from the time base generator. It differs from the pattern of the one-dimensional window in that three alternating cycles of Ph-1 and Ph-2 occur before each Ph-3 pulse, as illustrated in FIG. 16. That is, during Ph-1 cycle 1, the front porch pixel data for line 1 (e.g. pixel D1 data) is loaded into the FIFO stack and triggers an upcount. Then during Ph-2 cycle 1, the back porch data for line 1, (e.g. A1 data on the output side of the FIFO stack), issues to downcount a bin. Next, Ph2 cycle 1 loads D2 for an upcount, and Ph-2 cycle 2 reads A2 from the FIFO stack to downcount. Finally, Ph-1 cycle 3 inputs front porch data D3 for a bin upcount, and Ph-2 cycle 3 outputs A3 and downcounts. Now, Ph-3 triggers the priority encoder to generate an output. In summary, seven master clock cycles are needed to generate one pixel output. This translates to about 18 nanoseconds per master clock cycle. FIG. 15 illustrates the FIFO stack sequence for this operation, during and after initialization is completed.

Initialization of the plurality filter controller for a two-dimensional window includes specification of the window size and shape via the parameter port 17. This information is used to configure the time base generator to exercise the alternative pattern described in the preceding paragraph. The time base generator also goes through a different histogram initialization cycle because output line 1 is missing upper neighbors. That is, when generating the output for line 1, upcount and down-count signals Ph-1 and Ph-2 must be suppressed when the front and back porch data is outside the screen, i.e. for the stack values indicated by x for the stack contents as shown in the following line:

$$F1 \times E2\ E1 \times D2\ D1 \times C2\ C1 \times B2\ B1 \times A2\ A1 \times$$

This regular pattern is achieved by suppressing cycle 1 of Ph-2 while processing data for output line 1.

Thus, according to the present invention, after the filter configuration is initialized and the initial histogram is formed, the plurality filtering process of this illustrative embodiment can generally be divided into three phases. In the first phase, new pixel data is inputted, and the intensity value or contribution of each new pixel ("incoming pixel") is added to the appropriate histogram bin by incrementing the associated counter 17. In the second phase, the intensity data corresponding to the pixel which has fallen outside of the current window location, due to the window moving one pixel to the right ("outgoing pixel"), is subtracted from the corresponding histogram bin, i.e. the counter 17 associated with the intensity of the removed pixel is decremented or has a "1" subtracted from its present count. In the third phase, the output of the filter derived from the priority encoder 41 is latched in the output latch 43, and provided as an input via the output data lines 45, as to a destination frame buffer or video signal generator (see FIG. 1). If the operation is for processing single line scan data, the latching and outputting occur every time an incoming pixel is received by the filter window and an outgoing pixel is removed from the filter window. In the example of a 3×3 area window, three incoming pixels and three outgoing pixels must be processed before the output of the filter is latched. For this reason, as seen in FIG. 16, there are three Ph-1 pulses D1, D2, D3 and three Ph-2 pulses A1, A2, A3 for each Ph-3 pulse C2. In general, for each Ph-3 pulse there would be as many Ph-1 and Ph-2 pulses as there are pixels in the window.

In the event that either the front porch or the back porch is outside the defined data, i.e., at the beginning or end of the line or rectangle of pixels, no change is made in the histogram for such entries.

The Majority Filter

The present invention is also applicable to a majority filter, in which each target pixel value is replaced by the value of a majority (or other selected fraction) of the pixels in its neighborhood (window) or, if no single value exists for a majority (or any other portion) of the pixels, a zero value or value "1" may be outputted. That is, an output value, which is distinguished from possible majority pixel values, is used to flag the fact that for the particular window being processed, there is no clear majority. In an electoral analogy, this is a "hung jury". Such an output would be useful in distinguishing heterogeneous ("busy" or textured) regions from homogeneous regions in an image. FIG. 17 shows such a system, which is essentially the same as FIG. 10 except for the manner in which the reference counter operates. Like components are given like reference numerals.

Figure 17:
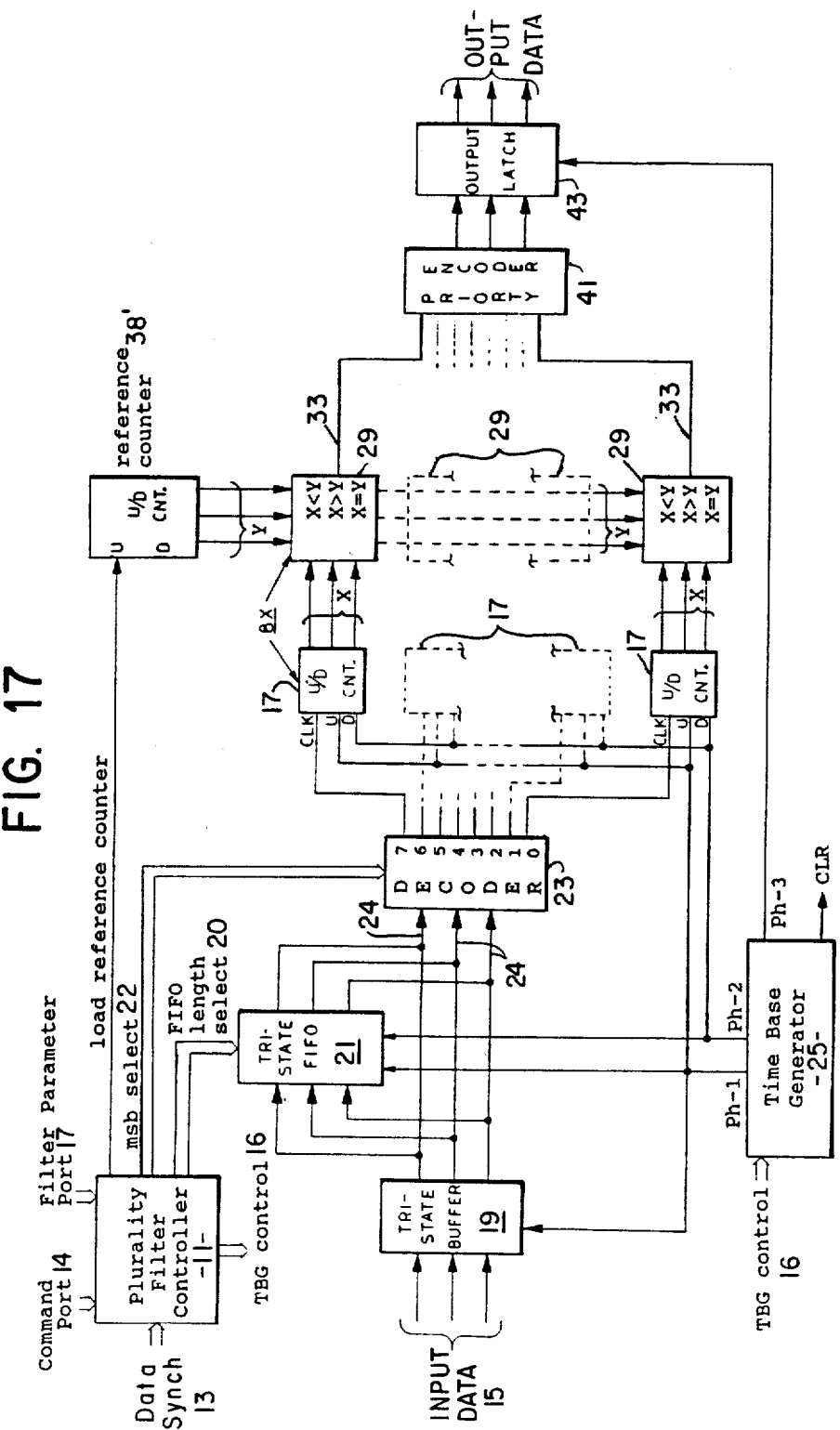
FIG. 17 shows a logic block diagram of a "majority filter" alternative embodiment of the invention.

In FIG. 17, the reference counter 38 is no longer activated from the comparators 29. Instead, it may be a simple register 38'. As part of the initialization procedure, a selected value for Y is set into register 38'. For example, for an 11-pixel window, Y may be set at 6, or any other value equal to or greater than w/2.

In this system, the comparators 29 only determine whether the bin count X exceeds the reference value Y. Thus only output lines for $X>Y$ are needed. With Y equal to or greater than w/2, only one bin count X can exceed Y. If this occurs, as before the priority encoder 41 receives the address (i.e., count value) of the bin for which $X=w/2$ and upon occurrence of control pulse Ph-3, the output latch is actuated to pass a value to the output to replace the value for the target pixel. In this case, priority encoder 41 may be replaced by a simple encoder, which receives the $X>Y$ output lines from comparators 29 and functions to provide as an output the address (value) of the comparator from which it is receiving an active signal. If no bin has $X \geq Y$, then the output value becomes preferably one (or zero, as may be predetermined). Alternatively, if no bin has $X \geq Y$ (i.e., there is no majority for that window) the previously valid bin value (intensity value) may remain in the output latch 43. In such case, the bin value, having a most significant bits, is supplemented by q-m zeros for least significant bits.

For a "heterogeneity filter", the target pixel value is replaced by a zero if the window provides a majority count (i.e., $X \geq Y$), or by a one if not. The result is a black and white representation of the original image, without gray tones, useful where transitions between light and dark are of interest.

Alternatively, the reference register 38' containing w/2 could be eliminated, and the comparators 29 replaced by a plurality of thresholders, respectively set at w/2 with Y selected to be less than w/2. This is less desirable, since more than one bin may then exceed Y, leading to the need to select among such bins. In general, the bin having the greatest address (i.e., pixel value) would be chosen as described in the case of the plurality filter.

It will be understood that in this specification and claims, the term "pixel" is intended to mean not only an image element but also any other parameter or item or element having an associated value, usually digital. In general, such a data element may correspond to a sample of an acoustic signal or an electronic signal whose source may be a communications transmitter or a sensor output.

The illustrations of the various components used in the FIG. 10 or FIG. 17 system are not meant to be limiting in any manner, but only for purposes of showing typical hardware that might be utilized for providing one embodiment of the invention.

It will be understood that the system of the invention may provide selectively the plurality filtering of FIG. 10 or the majority filtering of FIG. 17, or heterogeneity filtering by suitable switching means or software control for the inputs to the maximum count comparator 38 (or 38') and encoder 41.

Various embodiments of the present invention can also be provided through the use of firm-ware (ROM and coded computer programs); microcodes for bit-slice configurable computers; magnetic bubble logic; off-the-shelf digital counters and logic modules as illustrated above; very large scale integrated circuits (VLSI); parallel local neighborhood computers (GAPP, manufactured by National Semiconductor Corp. or CELLULAR AUTOMATA); optical switching or other electronic and optical digital devices; or digital signal processing chips, by way of example.

The scope of the invention is defined by the appended claims.

What is claimed is:

1. In a method for processing a sequence of data elements each having a parameter value, the totality of such values being within a pre-determined range of values, the steps comprising
   (a) defining a pre-determined set of classes of parameter values, where each class corresponds to a sub-range of said range of parameter values, and where each parameter value lies within a respective sub-range corresponding to one such class,
   (b) for each individual data element of said sequence, selecting a pre-determined multiplicity of neighboring data elements,
   (c) determining the sub-range for the parameter value of said individual data element and for the parameter value of each of said neighboring elements and increasing a count corresponding to the respective pre-determined class associated with that determined sub-range, (d) selecting without regard to rank order of parameter value a single one of said classes whose count is not exceeded by the count of any other class, and (e) replacing the parameter value of said individual element with a replacement value characteristic of said selected parameter value class.

2. A method as in claim 1 wherein each sub-range corresponds to a plurality of parameter values.

3. In a method for processing a sequence of data elements each having a parameter value, the totality of such values being within a pre-determined range of values, the steps comprising
   (a) defining a pre-determined set of classes of parameter values, where each class corresponds to a sub-range of said range of parameter values, and each parameter value lies within a respective sub-range corresponding to one such class,
   (b) for each individual data element of said sequence, selecting a pre-determined multiplicity of neighboring data elements,
   (c) determining the sub-range for the parameter value of said individual data element and for the parameter value of each of said neighboring elements and increasing a count corresponding to the respective pre-determined class associated with that determined sub-range,
   (d) selecting without sorting by rank a single one of said classes whose count has a pre-determined relation to all said counts, and
   (e) replacing the parameter value of said individual element with a replacement value characteristic of said selected parameter value class,
   (f) said pre-determined relation being any of (i) the maximum of all said counts or (ii) a count which is at least a pre-determined fraction of the number of said neighboring data elements.

4. In a method for processing a sequence of data elements each having a parameter value, the totality of such values being within a predetermined range of values, the steps comprising
   (a) defining a pre-determined set of classes of parameter values, where each class corresponds to a sub-range of said range of parameter values, and each parameter value lies within a respective sub-range corresponding to one such class,
   (b) for each individual data element of said sequence, selecting a pre-determined multiplicity of neighboring data elements,
   (c) determining the sub-range for the parameter value of said individual data element and for the parameter value of each of said neighboring elements and increasing a count corresponding to the respective pre-determined class associated with that determined sub-range,
   (d) selecting without sorting by rank a single one of said classes whose count has a pre-determined relation to all said counts, and
   (e) replacing the parameter value of said individual element with a replacement value characteristic of said selected parameter value class,
   (f) said replacement parameter value being that parameter value associated with the class whose count is greatest, to provide a plurality filter.

5. In a method for processing a sequence of data elements each having a parameter value, the totality of such values being within a pre-determined range of values, the steps comprising
   (a) defining a pre-determined set of classes of parameter values, where each class corresponds to a sub-range of said range of parameter values, and each parameter value lies within a respective sub-range corresponding to one such class,
   (b) for each individual data element of said sequence, selecting a pre-determined multiplicity of neighboring data elements,
   (c) determining the sub-range for the parameter value of said individual data element and for the parameter value of each of said neighboring elements and increasing a count corresponding to the respective pre-determined class associated with that determined sub-range,
   (d) selecting without sorting by rank a single one of said classes whose count has a pre-determined relation to all said counts, and
   (e) replacing the parameter value of said individual element with a replacement value characteristic of said selected parameter value class,
   wherein, for such a class whose count is more than a pre-determined portion of the total number of data elements in the neighborhood, said replacement parameter value is a "one", and in the absence of such a count, then said replacement parameter value is a "zero", to provide a heterogeneity filter.

6. In a method for processing a sequence of data elements each having a parameter value, the totality of such values being within a pre-determined range of values, the steps comprising
   (a) defining a pre-determined set of classes of parameter values, where each class corresponds to a sub-range of said range of parameter values, and each parameter value lies within a respective sub-range corresponding to one such class,
   (b) for each individual data element of said sequence, selecting a pre-determined multiplicity of neighboring data elements,
   (c) determining the sub-range for the parameter value of said individual data element and for the parameter value of each of said neighboring elements and increasing a count corresponding to the respective pre-determined class associated with that determined sub-range,
   (d) selecting without sorting by rank a single one of said classes whose count has a pre-determined relation to all said counts, and
   (e) replacing the parameter value of said individual element with a replacement value characteristic of said selected parameter value class,
   (f) said replacement parameter value being that parameter value associated with the class whose count is equal to at least half of the total number of data elements in the said neighborhood.

7. A method as in claim 6 wherein, in the absence of such a class whose count is at least half of the number of data elements in the neighborhood, then said replacement value is that value associated with the class into which the said individual data element was itself classified.

8. The method of any of claims 6, 7 or 5 in which said sequence of data elements is a series of digitized data elements of a signal, each data element having an intensity value constituting said parameter value.

9. The method of any of claims 6, 7 or 5 for non-linearly filtering an image processing system in which the image is a composite of a multiplicity of digitized pixels constituting said data elements, each data element having a gray-scale intensity value constituting said parameter value.

10. The method as in claim 6 wherein, in the absence of such a class whose count equal more than half the number of data elements in the window, then the replacement value is the original value of the target data element truncated to m bits and padded by zeros.

11. In a non-linear digital filter system of processing a signal comprising a sequence of digitized data elements having various digital data values, the method comprising the steps of:
   a) selecting a window for enclosing a portion of at least one sub-sequence of said signal having a multiplicity of data elements;
   b) selecting the beginning and the end of the sequence of data elements to be processed;
   c) locating said window at the beginning of said sequence;
   d) providing a histogram having a plurality of bins, each bin comprising a counter representing a respective value of the data elements, and causing each bin to have a count corresponding to the total number of data elements within said window having the value represented by the respective bin;
   e) designating the centermost data element within said window as a target data element;
   f) replacing the original value of the target data element with the value represented by the bin having the maximum count of all bins to provide a plurality filter.

12. The method of claim 11, where the replacement value in said step (f) is replaced by that value which is represented by the bin having a count representing more than half of the number of data elements in the window, to provide a majority filter.

13. The method of claim 11, further including the steps of
   g) shifting the window one data element closer to the end of the sequence, thereby causing a new data element to be enclosed by said window, and causing a previously included data element to be deleted from said window;
   h) changing said histogram by adding the contribution of the new element and subtracting the contribution of the deleted element; and
   i) repeating steps (e), (f), (g), and (h) in an iterative manner to the end of said sequence of data elements being processed.

14. The method of claim 9 in which the sequence of data elements represents a two-dimensional image and in which the said window is a two-dimensional window about a target pixel and in which the shifting of the window in step (g) (i) causes several pixels to be deleted from said window and causes their contributions to be subtracted from the counts of said bins, and (ii) causes several new pixels to be included in said window and causes their contributions to be added to the counts of said bins.

15. The method of claim 11 wherein said step (d) further includes the steps of:
   d1) selecting only m most significant bits of each data element value for processing wherein m is less than the total number of bits for the largest data value; and d2) providing $2^m$ bins for said histograms, each representing a sub-range of the entire range of possible data element values.

16. The method of claim 15 further including in step (f) the step of appending to each replacement data element value a number of zero bits equal to q-m, where q is the number of bits representing the original data element value.

17. The method of claim 15, in which the replacement value is replaced by "one" if one bin holds a count equal to more than a predetermined fraction of half the number of data elements, and "zero" otherwise, to provide a heterogeneity filter.

18. Apparatus for processing a set of data elements, each element having an individual parameter value, said apparatus comprising:
   (a) a multiplicity of counters, each counter corresponding to a bin of a histogram and also corresponding to a respective sub-range of parameter values;
   (b) means responsive to each said data element to increment the one of said counters which corresponds to the sub-range within which falls the parameter value of said data element to provide in said counter a count equal to the number of data elements having a parameter value within the sub-range corresponding to the respective histogram counter;
   (c) a reference counter circuit which holds a value equal to the highest count in any of said counters;
   (d) means for comparing the count value within each of said histogram counters against the value within the reference counter;
   (e) means for incrementing said reference counter when its value is less than any of said histogram counter values; and
   (f) means for providing an output responsive to the histogram counter whose count is not exceeded by the count of any other such histogram counter, after all data elements of said set have been processed.

19. An apparatus as in claim 18, wherein said reference circuit contains a count substantially equal to at least half of the number of data elements of said set.

20. An apparatus as in claim 18, further including:
   means for modifying said set of data elements to include one or more new elements and to exclude a like number of previously included elements,
   means for decrementing the counter or counters of said histogram corresponding to values of said excluded data element or elements, and for incrementing the counter or counters of said histogram corresponding to values of said newly included data element or elements; and
   means responsive to a condition where all of said histogram counters have counts less than that of said reference counter for decrementing said reference circuit output value.

21. An apparatus as in claim 20, wherein said decrementing means include an AND circuit connected to the outputs of all said histogram counters.

22. An apparatus as in claim 20, wherein said incrementing means includes an OR circuit connected to the outputs of all said histogram counters.

23. Apparatus in claim 22, further including
   means for providing an output responsive to the histogram counter whose count is not exceeded by the count of any other such histogram counter, after all data elements of said set have been processed.

24. An apparatus as in claim 23, wherein said output-providing means includes a means for deriving an output based on which of said histogram counters have a count equal to the count in the said reference circuit output.

25. A digital image-processing system, comprising:
a control parameter selector for selecting (a) a window width for a window enclosing a portion of at least one line having a plurality of pixels of an image to be processed, one of said pixels being a target pixel, and (b) the beginning and end of the domain of the line or lines of pixels to be processed;
means for locating the window at the beginning of the domain;
a histogram device comprising a multiplicity of counters, with each counter both (1) corresponding to a bin of said histogram, and (2) representing a respective sub-range of intensity values of said pixels, each counter being caused to have a count equivalent to the total number of pixels within said window having a value within the sub-range associated with that counter;
substitution means for selectively changing the intensity value of a target pixel of said window to a value associated with the sub-range corresponding to one of said counters;
shifting means for repetitively moving the window at least one pixel closer to the end of the domain, thereby causing one or more additional pixels adjacent the leading edge of said window to be enclosed by said window, and one or more pixels adjacent a trailing edge of said window to be excluded from said window;
updating means for changing said histogram by incrementing the counter or counters associated with the intensity value or values of the additional pixel or pixels, and decrementing the counter or counters associated with the intensity value or values of the excluded pixel or pixels;
said substitution means being responsive to said updating means for changing the value of the new target pixel of each new window position; and
a controller including clock means for cyclically operating said shifting means, said updating means and said substitution means.

26. A digital image-processing system for suppressing noise components and enhancing dominant features of an image represented by a data signal which comprises a succession of groups of most-significant data bits of predetermined number, each group of bits representing an intensity value of a digitized pixel in gray-scale scanned within a predetermined window of said image, said system comprising:
clock means for producing first, second and third clock signals, said first and second clock signals being of the same repetition rate and phase-separated with respect to one another, said third clock signal occurring periodically after the successive occurrence of a predetermined number of said first and second clock signals;
a buffer responsive to said first clock signal for successively receiving said digitized pixel data groups, and for outputting data corresponding to a last-received digitized pixel;
a FIFO shift register corresponding in number of stages to the number of pixels in said predetermined window, and coupled to said buffer for receiving as an input each successive digitized pixel data outputted from said buffer, and responsive to said second clock signal for outputting a digitized pixel corresponding to a pixel of the window of said image being processed;
a decoder coupled to said buffer and to said register and having an input port for receiving the digitized pixel data outputted from one of said buffer and said FIFO register, and having a multiplicity of output signal lines equal in number to $2^m$ where m is equal to the selected number of most-significant bits representing each one of said digitized pixels, such decoder being adapted to activate a single output line corresponding to the numerical value of the m most significant bits of the digitized pixel data at the input port;
$2^m$ up/down counters, each one having (i) an input terminal connected to a respective one of said plurality of output signal lines of said decoder, (ii) an up-count input terminal for receiving said first clock signals, (iii) a downcount input terminal for receiving said second clock signals, and (iv) an output port for outputting an m-bit binary signal corresponding to its count, each one of said counters representing a different bin of a histogram;
$2^m$ comparators, each having (i) first and second inputs and (ii) first, second and third outputs, said first comparator output providing a signal indicating that said first input is greater than said second input, said second comparator output providing a signal indicating that said first input is less than said second input, and said third comparator output providing a signal indicating that said first and second inputs are equal,
each of said comparator first inputs being connected to the output of a respective one of said up/down counters,
a reference circuit comprising a counter and input logic gates, having (i) a first input connected to said first comparator output, (ii) a second input connected to said second comparator output terminals, and (iii) an output connected to each second input of said comparators,
said reference circuit being adapted to increment its count upon receipt of a signal from any first output of said comparators, and being adapted to decrement its count upon receipt of second outputs from all said comparators,
whereby said third comparator output indicates which up/down counter has a count equal to the count in said reference circuit counter, which count is thereby maximum count.

27. Apparatus as in claim 26 further including:
a priority encoder (i) having a plurality of inputs each connected respectively to one of said third comparator outputs and (ii) an output for providing an m-bit signal corresponding to the value corresponding to a bin whose count is the maximum of all the bins.

28. Apparatus as in claim 27 further including:
an output latch circuit having a first input for receiving said third clock signal, and a second input connected to the output of said priority encoder, said latch circuit being responsive to said third clock signal for both (1) latching the output signal from said priority encoder, and (2) providing at an output terminal an output signal corresponding to the processed value of the digitized pixel provided as in input to said system.

29. The digital image-processing system of claim 27, wherein said priority encoder further includes means responsive to more than one of said counters having a total count equal to the count of said maximum bin counting means, for selecting the one of said first counters of equal count corresponding to the parameter value of the highest intensity value.

30. Apparatus for selecting a maximum data value element from a set of data elements having differing values, comprising
a group of counters, each adapted to have supplied to it data elements of said set having a respective individual value, each counter having an output representing the number of data elements of said set supplied to it which have its respective individual value, and
a corresponding group of comparators, each comparator having a first input supplied from a respective counter output, and having a second input,
each said comparator providing a first output responsive to said first comparator input being greater than said second comparator input, and a second output responsive to said first and second comparator inputs being equal,
a reference circuit having an output supplied to all of said comparator second inputs, and
an output circuit providing an output signal after all said data elements have been supplied to said counters, said signal being responsive to any of said first comparator inputs being at least equal to said second comparator input.

31. Apparatus as in claim 30, wherein
said reference circuit is a reference counter;
said reference counter having an input and including means responsive to a signal supplied to said input for incrementing its count; and
a circuit supplying said incremented count to all said comparator second inputs.

32. Apparatus as in claim 31, including a circuit connected to all of said comparator first outputs and adapted to supply to said reference counter a signal to increment said counter.

33. Apparatus as in claim 31 including
each said comparator including a third output responsive to its first comparator input being less than its second comparator input, and
a circuit connected to all of said third comparator outputs for supplying an output signal responsive to all of said first comparator inputs being less than said second comparator inputs for decrementing said reference counter.

34. Apparatus as in claim 31 including
a circuit responsive to all of said first comparator inputs being less than their respective second comparator inputs for decrementing said reference counter,
a circuit responsive to an output signal from any of said comparator first outputs for incrementing said reference counter, and
an output circuit responsive to a signal from one of said second comparator outputs.

* * * * *